US006704475B2

United States Patent
Jin et al.

(10) Patent No.: US 6,704,475 B2
(45) Date of Patent: Mar. 9, 2004

(54) MIRROR FOR USE WITH A MICRO-ELECTRO-MECHANICAL SYSTEM (MEMS) OPTICAL DEVICE AND A METHOD OF MANUFACTURE THEREFOR

(75) Inventors: Sungho Jin, Millington, NJ (US); Hareesh Mavoori, Picataway, NJ (US); Roland Ryf, Aberdeen, NJ (US)

(73) Assignees: Agere Systems Inc., Allentown, PA (US); Lucent Technologies Inc., Murray Hill, NJ (US)

(*) Notice: Subject to any disclaimer, the term of this patent is extended or adjusted under 35 U.S.C. 154(b) by 134 days.

(21) Appl. No.: 09/825,005

(22) Filed: Apr. 3, 2001

(65) Prior Publication Data

US 2002/0141690 A1 Oct. 3, 2002

(51) Int. Cl.[7] .............................. G02B 6/35; G02B 5/08
(52) U.S. Cl. ........................ 385/18; 359/838; 359/872
(58) Field of Search ................... 385/15–18, 31, 385/47; 359/838, 872, 884, 515, 601

(56) References Cited

U.S. PATENT DOCUMENTS

| 6,052,217 | A | * | 4/2000 | Hwang ..................... 359/291 |
| 6,282,010 | B1 | * | 8/2001 | Sulzbach et al. ........... 359/249 |
| 6,289,145 | B1 | * | 9/2001 | Solgaard et al. ............ 385/17 |
| 6,377,535 | B1 | | 4/2002 | Chen et al. ............ 369/112.09 |
| 6,379,984 | B1 | * | 4/2002 | Sandberg et al. ............. 438/29 |
| 6,392,220 | B1 | | 5/2002 | Slater et al. ................ 250/216 |
| 6,396,789 | B1 | | 5/2002 | Guerra et al. ............... 369/112 |
| 2002/0071166 | A1 | | 6/2002 | Jin et al. .................... 359/224 |
| 2002/0071169 | A1 | | 6/2002 | Bowers et al. .............. 359/291 |
| 2002/0075554 | A1 | | 6/2002 | Brophy et al. .............. 359/291 |
| 2002/0097952 | A1 | | 7/2002 | Jin et al. ...................... 385/18 |
| 2002/0105725 | A1 | | 8/2002 | Sweatt et al. ............... 359/566 |

OTHER PUBLICATIONS

L. Y. Lin, E.L. Goldstein and R. W. Tkach; "Free Space Micromachined Optical Switches With Submillisecond Switching Time For Large–Scale Optical Rossconnects"; IEEE Photonics Technology Letters, vol. 10; No. 4, Apr. 1998; pp. 525–527.

Raanan A. Miller and Yu–Chong Tai; "Micromachined Electromagnetic Scanning Mirrors"; 1997 Society of Photo–Optical Instrumentation Engineers; pp. 1399–1407.

Jack W. Judy and Richard S. Miller; "Magnetic Microactuation Of Torsional Polysilicon Structures"; Senosors and Actuator A53 (1996); pp. 392–397.

William D. Cowan and Victor M. Bright; Vertical Thermal Actuators For Micro–Opto–Electro–Mechanical Systems; SPIE vol. 3226; pp. 137–146.

* cited by examiner

Primary Examiner—John D. Lee
Assistant Examiner—Sarah Song

(57) ABSTRACT

A mirror, or an array of mirrors, for use in a micro-electro-mechanical system (MEMS) optical device. The mirror includes a mirror substrate having a loss-reducing layer located over a first or second side thereof, and a light reflective optical layer located over the loss-reducing layer. The inventive mirror reduces undesirable Fabry-Perot interferrometric optical loss through minimizing the extent of multiple reflections within the MEMS mirror substrate.

38 Claims, 21 Drawing Sheets

MIRROR FOR USE WITH A MICRO-ELECTRO-MECHANICAL SYSTEM (MEMS) OPTICAL DEVICE AND A METHOD OF MANUFACTURE THEREFOR

TECHNICAL FIELD OF THE INVENTION

The present invention is directed, in general, to an optical device and, more specifically, to a mirror or an array of mirrors for use with a micro-electro-mechanical system (MEMS) optical device, and a method of manufacture therefor.

BACKGROUND OF THE INVENTION

Optical communication systems typically include a variety of optical devices, for example, light sources, photo detectors, switches, cross connects, attenuators, mirrors, amplifiers, and filters. The optical devices transmit optical signals in the optical communications systems. Some optical devices are coupled to electro-mechanical structures, such as thermal actuators, forming an electro-mechanical optical device. The term electro-mechanical structure, as used herein, refers to a structure that moves mechanically under the control of an electrical signal.

Some electro-mechanical structures move the optical devices from a predetermined first position to a predetermined second position. Cowan, William D., et al., "Vertical Thermal Actuators for Micro-Opto-Electro-Mechanical Systems," SPIE, Vol. 3226, pp. 137–146 (1997), describes one such electro-mechanical structure useful for moving optical devices in such a manner.

These micro-electro-mechanical systems (MEMS) optical devices often employ a periodic array of micro-machined mirrors, each mirror being individually movable in response to an electrical signal. For example, the mirrors can each be cantilevered and moved by an electrostatic, piezoelectric, magnetic, or thermal actuation. See articles by L. Y. Lin, et al., IEEE Photonics Technology Lett. Vol. 10, p. 525, 1998, R. A. Miller, et al. Optical Engineering Vol. 36, p. 1399, 1997, and by J. W. Judy et al., Sensors and Actuators, Vol. A53, p. 392, 1996, which are incorporated herein by reference.

The mirrors used in these optical devices are typically made up of a material which reflects light with high reflectivity at a desired operating wavelength of the light, for example an operating wavelength ranging from about 800 nm to about 1600 nm for $SiO_2$ optical fiber-based telecommunication systems. Some examples of such reflective materials are gold, silver, rhodium, platinum, copper and aluminum. These reflective metal films typically have a thickness ranging from about 20 nm to about 2000 nm, and are deposited on a movable membrane substrate such as a silicon substrate. At least one adhesion-promoting bond layer is desirably added between the reflective metal film and the substrate in order to prevent the reflective metal film from getting peeled off.

A typical MEMS mirror comprises a metal-coated silicon mirror movably coupled to a surrounding silicon frame via a gimbal. Two torsional members on opposite sides of the mirror connect the mirror to the gimbal, and on opposite sides of the mirror, define the mirror's axis of rotation. The gimbal, in turn, is coupled to the surrounding silicon frame via two torsional members defining a second axis of rotation orthogonal to that of the mirror. Using the typical MEMS mirror, the light beam can be reflected and steered in any direction.

Commonly, electrodes are disposed in a cavity underlying the mirror and the gimbal. Voltages applied between the mirror and an underlying electrode, and between the gimbal and an electrode, control the orientation of the mirror. Alternatively, an electrical signal can control the position of the mirror magnetically or piezoelectrically.

Turning to Prior Art FIGS. 1 and 2, illustrated is a typical MEMS mirror device and its application. FIG. 1 illustrates a prior art optical MEMS mirror device 100. The device 100 comprises a mirror 110 coupled to a gimbal 120 on a polysilicon frame 130. The components are fabricated on a substrate (not shown) by micromachining processes such as multilayer deposition and selective etching. After etching, the mirror 110, the gimbal 120 and the polysilicon frame 130, are raised above the substrate by upward bending lift arms 140, typically using a release process. The mirror 110 in the example illustrated in FIG. 1, is double-gimbal cantilevered and attached onto the polysilicon frame 130 by springs 150. The mirror 110 can be tilted to any desired orientation for optical signal routing via electrostatic or other actuation, using electrical voltage or current supplied from outside. Typically, the mirror 110 includes a light-reflecting mirror surface 160 coated over a polysilicon membrane 170, which is typically of circular shape. The light-reflecting mirror surface 160 is generally deposited by known thin film deposition methods, such as evaporation, sputtering, electrochemical deposition, or chemical vapor deposition.

Turning briefly to Prior Art FIG. 2, illustrated is an important application of the mirror 110 illustrated in FIG. 1. FIG. 2 illustrates an optical cross connect system 200 for optical signal routing, including an array of mirrors 210. The optical cross connect system 200 shown in FIG. 2 includes an optical input fiber 220, an optical output fiber 230 and the array of MEMS mirrors 210, including a primary mirror 212 and an auxiliary mirror 215. As is illustrated, an optical signal from the input fiber 220 is incident on the primary mirror 212. The primary mirror 212, with the aid of the auxiliary mirror 215, is electrically controlled to reflect the incident optical signal to the optical output fiber 230. In alternative schemes, the input fibers and the output fibers are in separate arrays, and a pair of MEMS mirror arrays are used to perform the cross connect function.

The tilting of each mirror is controlled by applying specific electric fields to one or more of the electrodes beneath the mirror. Undesirable variations in the gap spacing between the mirror layer and the electrode layer, symmetric or nonsymmetric, may alter the electric field for the applied field, which affects the degree of electrostatic actuation and hence the degree of mirror tilting. This in turn alters the path or coherency of light signals reaching the receiving fibers, thus increasing the signal loss during beam steering.

An array of such MEMS mirrors is essentially composed of two layers: a mirror layer comprising the array of mirror elements movably coupled to a surrounding frame, and an actuator layer comprising the electrodes and conductive paths needed for electrical control of the mirrors. One approach to fabricating the array is to fabricate the actuator layer and the mirror layer as successive layers on the same workpiece and then to lift up the mirror layer above the actuator layer using vertical thermal actuators or using stresses in thin films.

An alternative approach is to fabricate the mirror layer on one substrate, the actuator layer on a separate substrate and then to assemble the mating parts with accurate alignment and spacing. The two-part assembly process is described in U.S. Pat. No. 5,629,790 issued to Neukermans et al. on May 13, 1997, which is incorporated herein by reference. This two-part assembly process provides a more robust structure, greater packing density of the movable mirrors, and permits larger mirror sizes and rotation angles, as well as being easily scalable for larger arrays using silicon fabrication processes. The movable membrane in such a MEMS device is preferably made of single crystal silicon, and is typically only several micrometers thick. Such a thin silicon membrane is made, for example, by using the well-known silicon-on-insulator (SOI) fabrication process. The SOI process allows a convenient way of fabricating a thin silicon membrane, and the presence of a buried oxide layer is useful as an etch-stop barrier in photolithographical fabrication of the mirror, gimbal and spring/torsion bar structures. Selected patterned areas of the SOI substrate are etched, e.g., by using chemical etch, reactiveion etch, or a combination of these processes to form the mirror array pattern with cavity structure. The gimbals and the torsion bars are also formed around each mirror. The SOI material and process are described, for example, in *Concise Encyclopedia of Semiconducting Materials and Related Technologies*, Edited by S. Mahajan and L. C. Kimmerling, Pergamon Press, New York, 1992, p. 466.

Since the movable membrane is typically thin and fragile, with about a 1–10 micrometer thickness for the ease of mirror movement operation, the mirror layer substrate base (for example, SOI material), which carries the mirrors and gimbals, is advantageously made substantially thicker than the movable mirror membrane, thus providing mechanical stability to the structure. The desired thickness of the SOI substrate for MEMS mirror applications is typically in the range of 50–1000 micrometers, preferably 200–500 micrometers.

In the surface-micro-machined optical MEMS devices, such as optical cross-connects, the movable mirrors are often made of poly-silicon membranes, and are coated with a light-reflecting metal such as gold or aluminum on the top surface. The deposition of such metallization films introduces stresses in the mirror, which tends to cause undesirable mirror curving. This may be due to a number of different reasons, such as a film-substrate mismatch in the coefficient of thermal expansion (CTE), a mismatch in the lattice parameter, nonequilibrium atomic arrangement in the film, inadvertent or intentional incorporation of impurity atoms, etc. The presence of such stresses tends to cause a variety of dimensional instability problems, especially if the substrate is relatively thin, as is the case in the MEMS membranes, which are usually only several-micrometers thick. Other examples of the stress caused dimensional problems in the MEMS mirror structure, may include: i) undesirable bowing of the mirror substrate (membrane), which results in a non-focused or nonparallel light reflection and an increased loss of optical signal, ii) time-dependent change in mirror curvature due to the creep or stress relaxation in the reflective metal film, bond layer or the membrane substrate, and iii) temperature-dependent change in mirror curvature due to the altered stress states and altered CTE mismatch conditions in the metal film, bond layer, and membrane substrate materials, with changing temperature.

Turning initially to Prior Art FIG. 3, shown is a graph 300 that illustrates experimental data showing the mirror curvature and temperature dependent change problems arising from the use of single-sided metallization on a Si MEMS membrane. As is evident from FIG. 3, the single-sided metallization produces undesirable mirror curvature as well as a severe temperature-dependent change in curvature, both of which are undesirable for light beam steering applications such as optical cross-connects. In the current example, the primary reason for the curvature formation is most likely the stress caused by the substantial mismatch in the coefficient of thermal expansion (CTE) between the Si membrane (about $4 \times 10^{-6}/^\circ$ C.) and the metallization (about $14 \times 10^{-6}/^\circ$ C.), although the film growth-related stresses may also contribute.

Achieving a flat mirror with a small curvature is essential in order to minimize optical losses associated with such non-flat mirrors. In addition, ensuring a small curvature with a low or negligible temperature dependence of mirror curvature is important, as the optical MEMS mirrors are often subjected to high temperature exposure for the purpose of assembly, packaging and other manufacturing processes, as well as to fluctuations in ambient temperature during operation. One way of correcting such curvature and restoring flat mirror geometry is to employ ion implantation which introduces a compressive stress to cancel out the existing tensile stress in the curved (often concave upward) mirrors.

Such an undesirable mirror curvature in one-side metallized silicon membrane is also seen in the case of the two-part MEMS assembly structure where the mirror layer is, for example, made of the single crystal silicon membrane fabricated from the SOI substrate, and is then subsequently bonded to the electrode layer to form the actuateable MEMS device. However, in this case, both sides of the mirror layer are available for metallization, and the mirror curvature problem can thus be resolved through using a double-layered metallization, i.e., by depositing the same metallization in exactly the same thickness onto both the top and the bottom surface of the silicon membrane, so that the metallization-induced stresses are balanced. Turning briefly to Prior Art FIG. 4, shown is a graph 400 that illustrates experimental data showing the benefits arising from the use of double-sided metallization on the Si MEMS membrane. As can be noticed from FIG. 4, the mirror is substantially flat and contains only a small temperature dependence of curvature.

The presence of two parallel, highly reflective surfaces at the top and bottom surfaces of the silicon membrane, however, introduces multiple light reflections within the silicon membrane, and tends to cause undesirable optical interference and signal loss. The optical interference and signal loss, which is generally referred to as Fabry-Perot (F-P) interferrometric loss, and is more thoroughly discussed in the book by E. Hecht, Optics, 3rd edition, Addison-Wesley, New York, 1998, p. 413–416, is illustrated in FIG. 5. The data in FIG. 5 represents the calculation of F-P interferrometric loss in an optical signal reflected from a 3 $\mu$m thick MEMS silicon membrane mirror coated double-side with varying thicknesses of gold metallizations. As is evident from FIG. 5, the presence of Fabry-Perot cavity, with the light beam repeatedly reflecting from the two bounding metallization mirror layers (double-sided Au metallizations), introduces non-uniform wavelength-dependent F-P interferrometric loss, which is especially significant for the thinner metallizations. If the metallization thickness is increased, e.g., to about 80 nm as in FIG. 3, the F-P loss is progressively reduced, although not completely.

The use of the thicker metallization layer, however, poses another problem of adding too much weight to the movable membrane. Gold, which as previously mentioned may act as one metallization material, has a density of 19.32 g/cm$^3$, which is more than about 8 times heavier than the Si membrane material (density–2.33 g/cm$^3$). Increasing the gold thickness from about 33 nm to about 80 nm on both sides of the 3 μm thick Si membrane would increase the overall weight of the movable membrane by more than about 25%. Such an increase in the mass of the movable membrane is not desirable, as it affects the dynamics of mirror movement and slows down the response time substantially, and further, the resonance frequency of the mirror will be reduced, increasing the sensitivity to external mechanical perturbations during operation. In addition, the increase of mass on the MEMS spring regions raises the stiffness of the spring, and hence the actuation voltage to move the mirror by a given displacement or tilt angel will have to be increased significantly.

It is desirable to have a double-side metallized MEMS mirrors so that the flatness of the mirrors is maintained, yet at the same time such Fabry-Perot interference loss is prevented or minimized. Accordingly, what is needed in the art is a micro-electro-mechanical system optical device, and a method of manufacture therefore, that does not encounter the problems associated with mirror curvature and F-P interferrometric loss, as experienced in the prior art electro-optic MEMS devices.

SUMMARY OF THE INVENTION

To address the above-discussed deficiencies of the prior art, the present invention provides a mirror, or array of mirrors, for use in a micro-electro-mechanical system (MEMS) optical device. The mirrors include a mirror substrate having a loss-reducing layer located over a first or second side thereof, and a light reflective optical layer located over the loss-reducing layer.

In another aspect, the present invention includes a method of manufacturing the mirror. The method includes (1) providing a mirror substrate having a loss-reducing layer located over a first or second side thereof, and (2) forming a light reflective optical layer located over the loss-reducing layer.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

Prior Art

Prior Art

Prior Art

Prior Art

Prior Art

DETAILED DESCRIPTION

Figure 1:
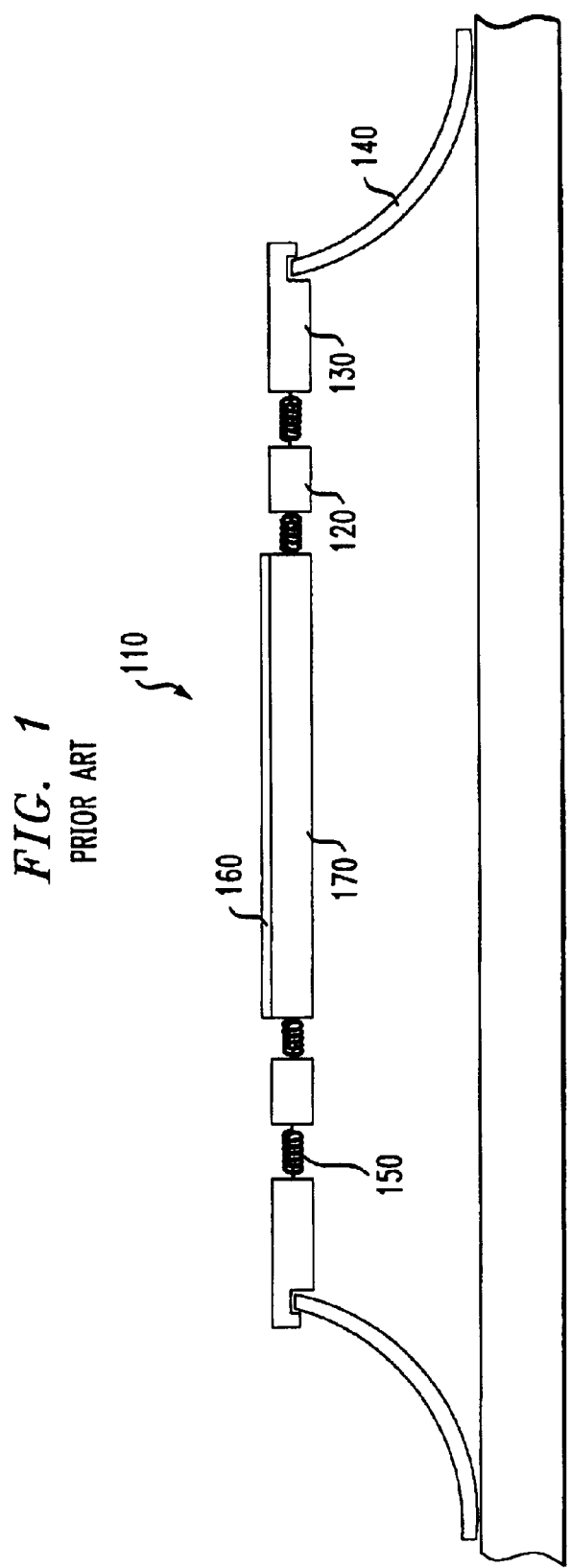
FIG. 1 illustrates a traditional surface-micromachined-type MEMS device.
Figure 2:
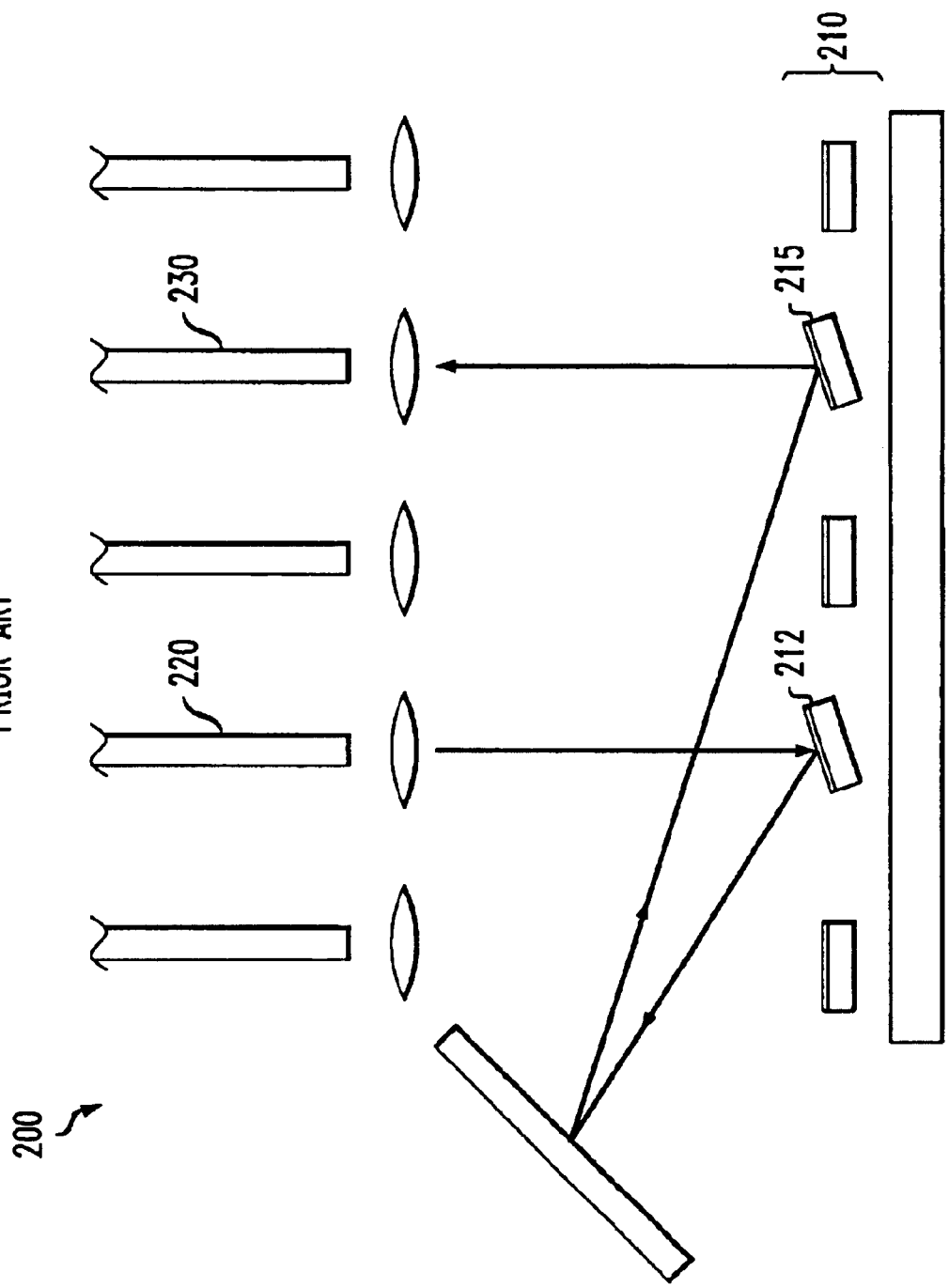
FIG. 2 illustrates an optical cross connect system for optical signal routing, including an array of traditional surface-machines-type MEMS device.
Figure 3:
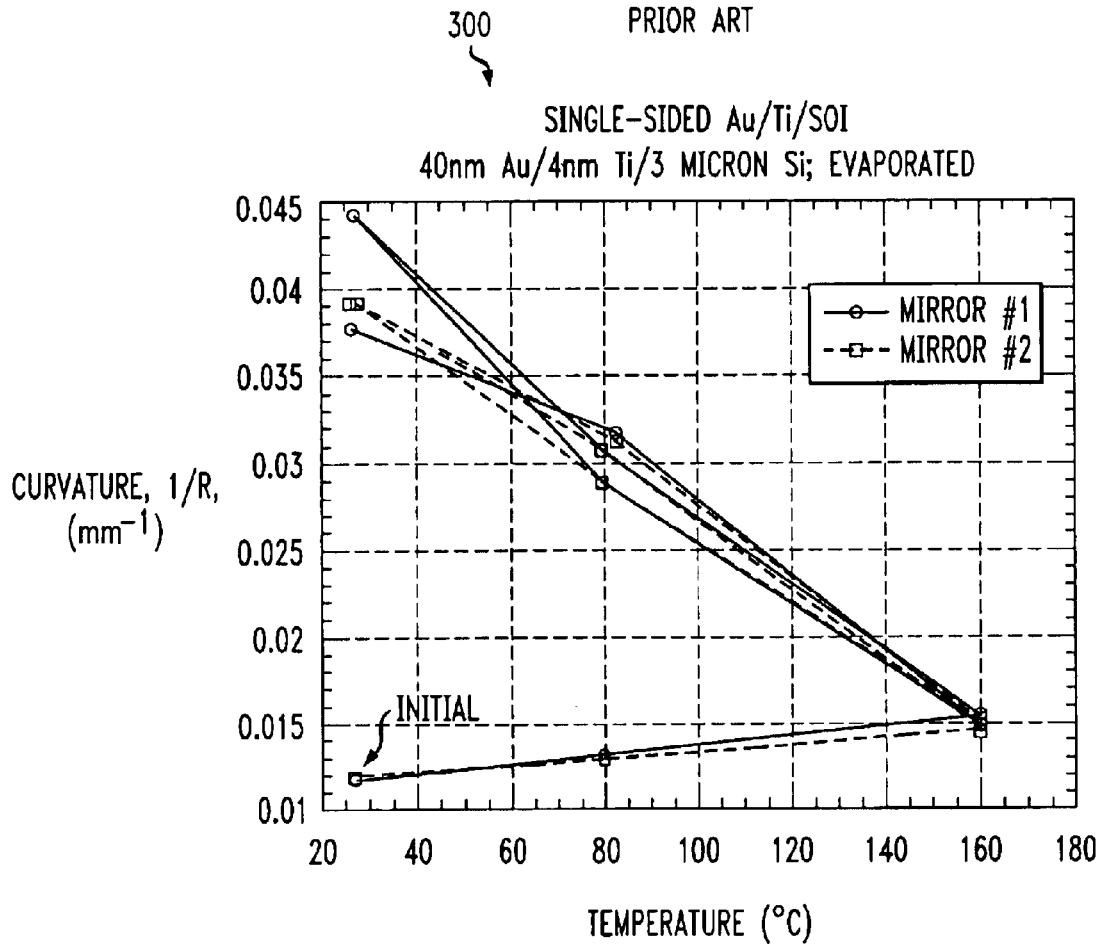
FIG. 3 illustrates a graph that depicts experimental data showing mirror curvature and temperature dependent change problems arising from the use of single-sided metallization on a Si MEMS membrane.
Figure 4:
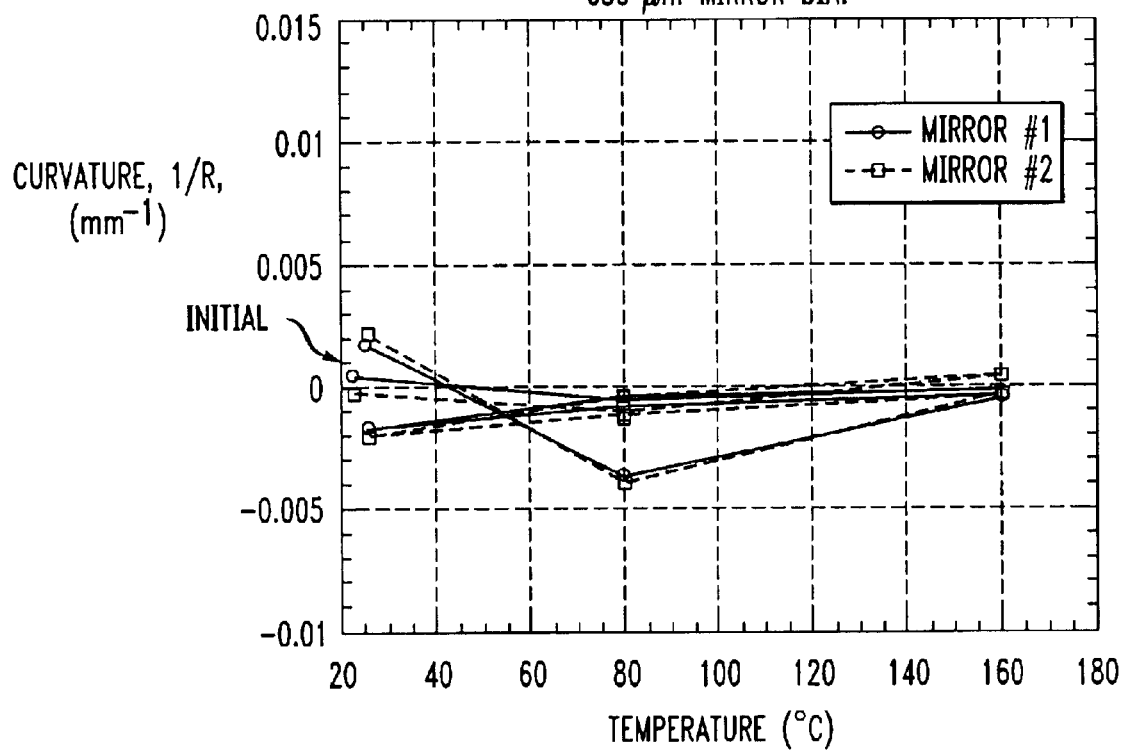
FIG. 4 illustrates a graph that depicts experimental data showing the benefits arising from the use of double-sided metallization on a Si MEMS membrane.
Figure 5:
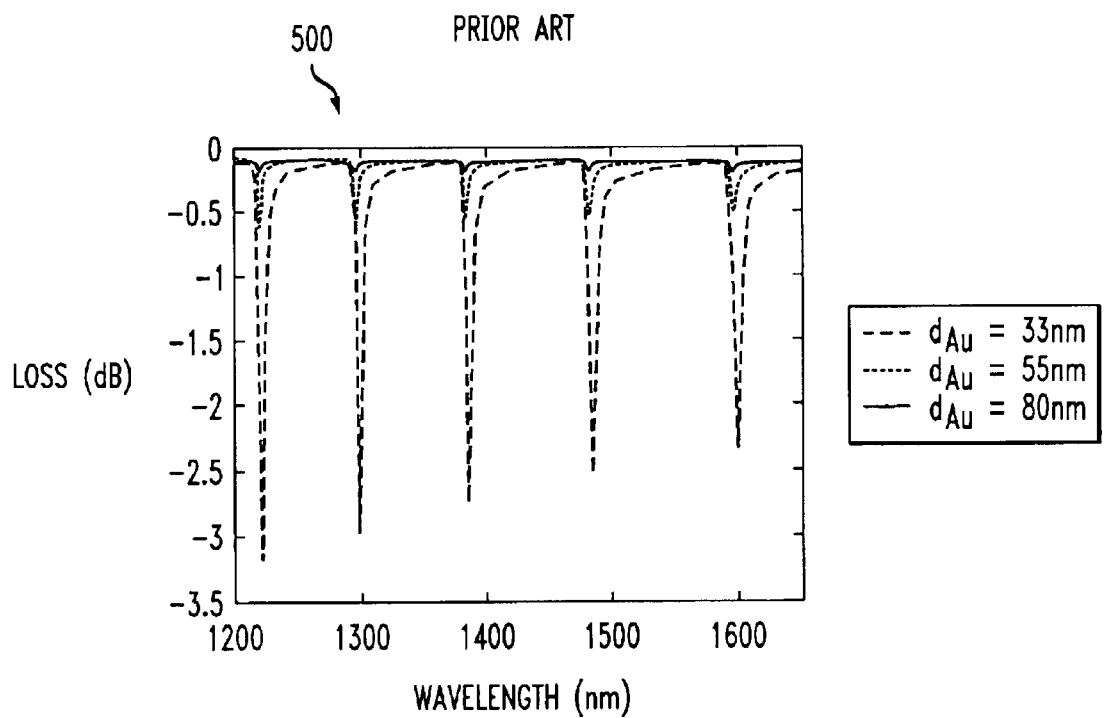
FIG. 5 illustrates a calculation of Fabry-Perot (F-P) interferrometric loss in an optical signal reflected from a 3 μm thick MEMS silicon membrane mirror coated double-side with varying thicknesses of gold metallizations.
Figure 6:
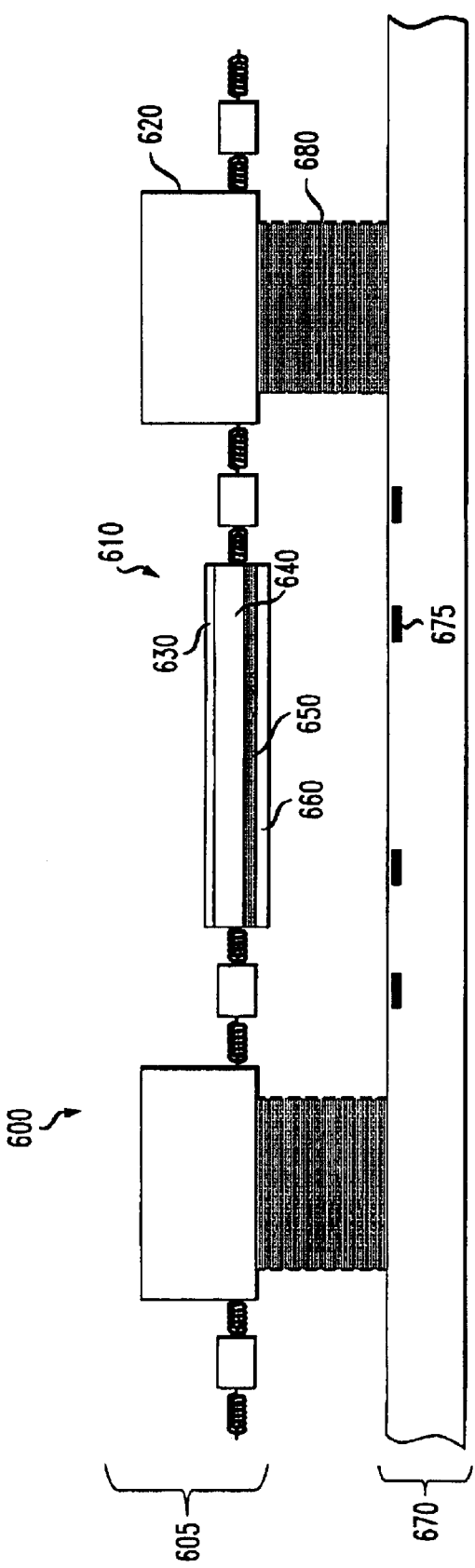
FIG. 6 illustrates one embodiment of a completed microelectro-mechanical system (MEMS) optical device, including a mirror, which is in accordance with the present invention.

Referring initially to FIG. 6, illustrated is one embodiment of an exemplary two-part optical MEMS device 600, including an actuating layer 605 having a mirror 610, which is in accordance with the present invention. As illustrated in FIG. 6, the actuating layer 605 includes the mirror 610 and a mounting substrate 620, on which the mirror 610 is moveably mounted. The mirror 610 comprises a mirror substrate 640 having a loss-reducing layer 650 located over a first or second side thereof. In the illustrative embodiment shown in FIG. 6, the loss-reducing layer 650 is located over the second side, however, this may not always be the case. The mirror 610 further includes a light reflective optical layer 630 located over the loss-reducing layer 650. The light reflective optical layer 630, in the embodiment shown in FIG. 6, is located over the first side of the mirror substrate 640, however, similar to above, this may not always be the case. If the addition of the loss-reducing layer 650 does not fully compensate for stress caused by the light reflective optical layer 630, then an additional stress balancing optical layer 660, may be used. In the illustrative embodiment shown in FIG. 6, the stress balancing optical layer 660 is further located over an opposite side of the mirror substrate 640 as the light reflective optical layer 630 is located. If the stress balancing optical layer 660 is used, it may comprise the same material or a different material as the light reflective optical layer 630. It should be noted that the embodiments illustrated in FIG. 6 and throughout the remainder of this document, are discussed without respect to orientation.

The two-part optical MEMS device 600 may further include an electrode layer 670, including at least one actuating electrode 675, and leads (not shown), for applying voltage between the electrode 675 and the mirror 610. The actuating layer 605 is mechanically attached, e.g., by solder bonding or epoxy bonding, to the electrode layer 670 with a controlled vertical gap spacing, which can be controlled, e.g., by using a fixed thickness spacer 680.

The mirror 610 including the loss-reducing layer 650 exhibits substantially reduced Fabry-Perot (F-P) interferrometric loss as compared to an identical mirror without the loss-reducing layer 650. For example, in an advantageous embodiment of the present invention, the use of the loss-reducing layer 650 reduces Fabry-Perot (F-P) interferrometric loss by at least about 20% for operating wavelengths of about 1.55 µm. In other embodiments, the reduction in the F-P loss may be up to about 80%.

Figure 7:
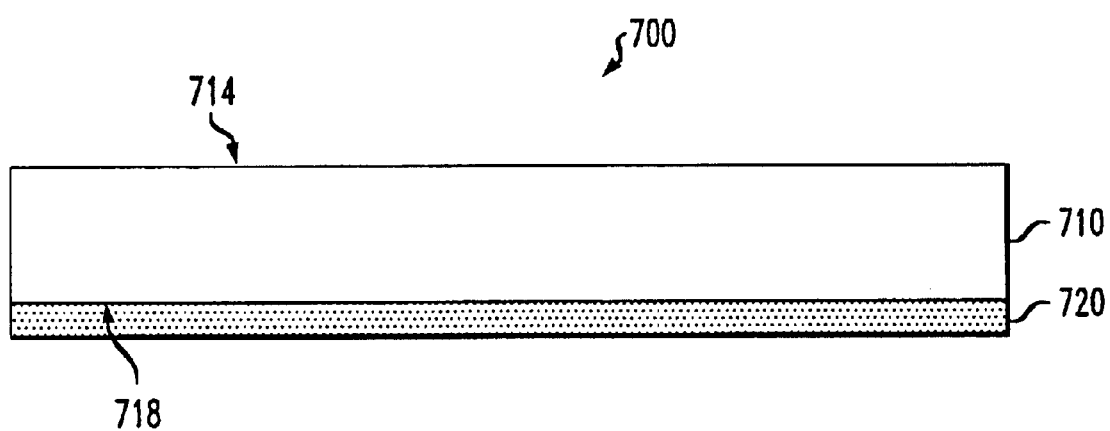
FIGS. 7 and 10 illustrate detailed manufacturing steps instructing how one might, in a preferred embodiment, manufacture the completed mirror depicted in FIG. 6.
Figure 10:
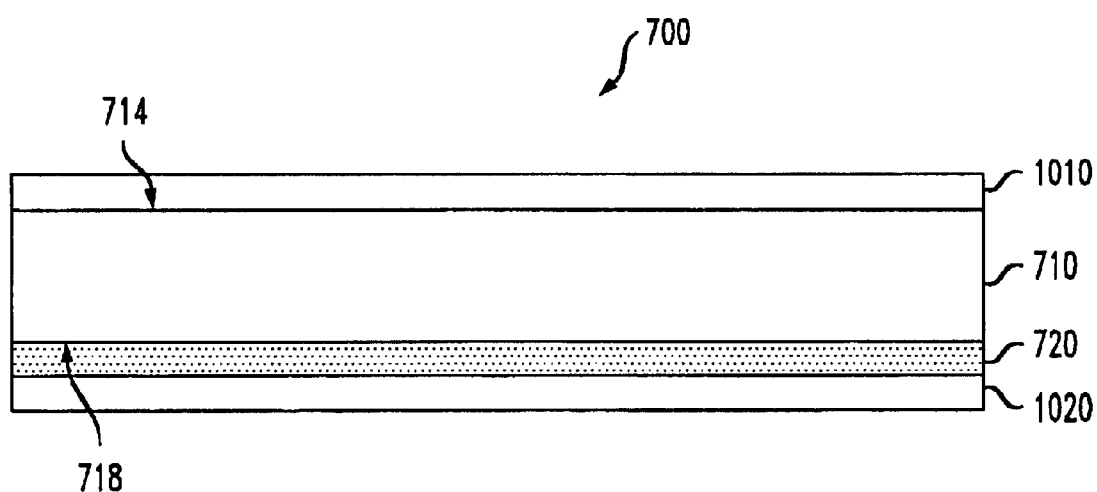

Turning to FIGS. 7 and 10, with continued reference to FIG. 6, illustrated are detailed manufacturing steps instructing how one might, in a preferred embodiment, manufacture the mirror 610 depicted in FIG. 6. FIG. 7 illustrates a cross-sectional view of a partially completed mirror 700, including a mirror substrate 710. As illustrated, the mirror substrate 710 includes a first side 714 and an opposing second side 718. In an exemplary embodiment, the mirror substrate 710 is a single crystal silicon substrate, however, it should be noted that other similar substrates known to those who are skilled in the art could be used. For example, poly silicon, silicon nitride, silicon carbide, silicon oxide, diamond film, or any combination of these materials may be used as the mirror substrate 710. In an exemplary embodiment, the mirror substrate 710 has a thickness that ranges from about 1000 nm to about 10000 nm.

Desirably formed over the second side 718 of the mirror substrate 710 is a loss-reducing layer 720, which tends to absorb, rather than reflect light. It should be noted that while the loss-reducing layer 720 is shown formed on the second side 718 of the mirror substrate 710, one skilled in the art understands that one or more layers, e.g., adhesion layers, could be interposed between the second side 718 of the mirror substrate 710 and the loss-reducing layer 720. Regardless, the loss-reducing layer 720 substantially reduces the amount of F-P that the completed optical device 600 might experience during operation. It should be further understood that the loss-reducing layer 720 may be located on the first side 714, second side 718 or both sides of the mirror substrate 710, and that which is shown in FIG. 7 is just one embodiment of the invention.

The loss-reducing layer 720, in an advantageous embodiment, has a light reflectivity (R) of less than about 0.6, when used in conjunction with certain operational wavelengths, e.g., about 1.55 µm. In more preferred embodiments, the loss-reducing layer 720 has a light reflectivity (R) of less than about 0.2 at the same previously mentioned operational wavelengths. One skilled in the art understands, however, that various operational wavelengths are currently used in the industry, thus the above mentioned light reflectivity values may vary, depending on the operational wavelength, without departing from the scope of the present invention. The selection of the loss-reducing layer material, thus depends on a particular operating wavelength to be used.

The overall reflectivity (R) of a material can be affected by specific material structure variations such as porosity, grain structure, surface roughness. Not counting such material structural variations, the R may generally be correlated to more fundamental properties of the material, e.g., through the relationship of $R=[(N-1)/(N+1)]^2$, where N is the complex refractive index. The interaction between light and metals takes place involving the optical electric field and the conduction band electrons of the metal. Some of the light energy can be transferred to the lattice by collisions in the form of heat. The optical properties of metals can, thus be described by the complex refractive index N, which is characterized by the two optical constants, e.g., index of refraction n and extinction coefficient k, through a relationship of $N=n+ik$.

Broadly speaking, the Fabry-Perot optical loss in a multilayer stack of different materials is a complicated phenomenon. The nature and the magnitude of such a loss is strongly dependent on the type and crystal orientation of materials in the stack, the geometry/sequence of stacked layers, the thickness of each layer, the index of refraction, the extinction coefficient, the wavelength of the incident beam, and other parameters. The amount of light reflected and transmitted by a multilayer stack can be calculated considering the light amplitude reflectivity and amplitude transmission coefficients between the boundary of two layers, and the absorption, propagation velocity and thickness of the individual layers. In particular, multiple reflections of the light at each boundary have to be considered. The techniques used to calculate the light reflected and transmitted by the multilayer stack are well known to those skilled in art, and a detailed description can be found, for example, in M. Born, E. Wolf, "Principle of optics," Chapter 7.6.1, entitled "Multiple beam fringes with a plane parallel plate" Cambridge, 1999, $7^{th}$ edition. The calculations require the following parameters: complex refractive index N for each layer, the thickness d of each layer and the wavelength of the incident light.

Based on these calculations, the effect of adding the inventive, loss-reducing layer into the Fabry-Perot configuration of the MEMS device has been estimated for the six possible cases of inventive embodiments schematically illustrated in FIGS. 8A–8F, with the reduced loss data shown as n vs. k plots in the drawings of FIGS. 9A–9F. The numbers illustrated in FIGS. 9A–9F represent the reduced percentage of Fabry-Perot loss as compared to the loss in the Fabry-Perot structure without the inventive loss-reducing layer. The thickness of the light reflective optical layer was fixed at 33 nm and that of the loss-reducing layer at 10 nm. If the thickness of the loss-reducing layer is substantially thinner than 10 nm, the loss-reducing effect may be substantially diminished. If the thickness is increased, e.g., to 100 nm, the favorable index of refraction (n) and extinction coefficient (k) values tend to become smaller.

Figure 8A:
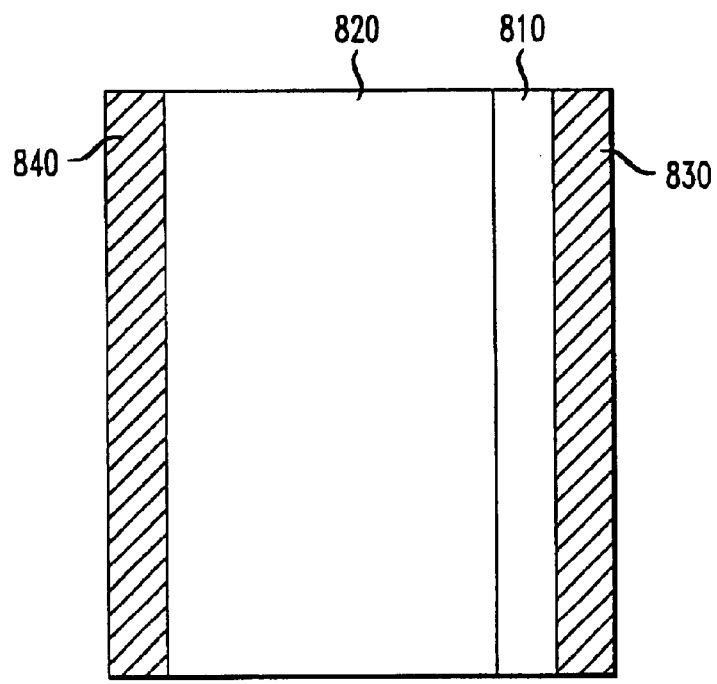
FIGS. 8A–8E and 9A–9E illustrate various embodiments of the present invention and n vs. k values for each of the embodiments.
Figure 9A:
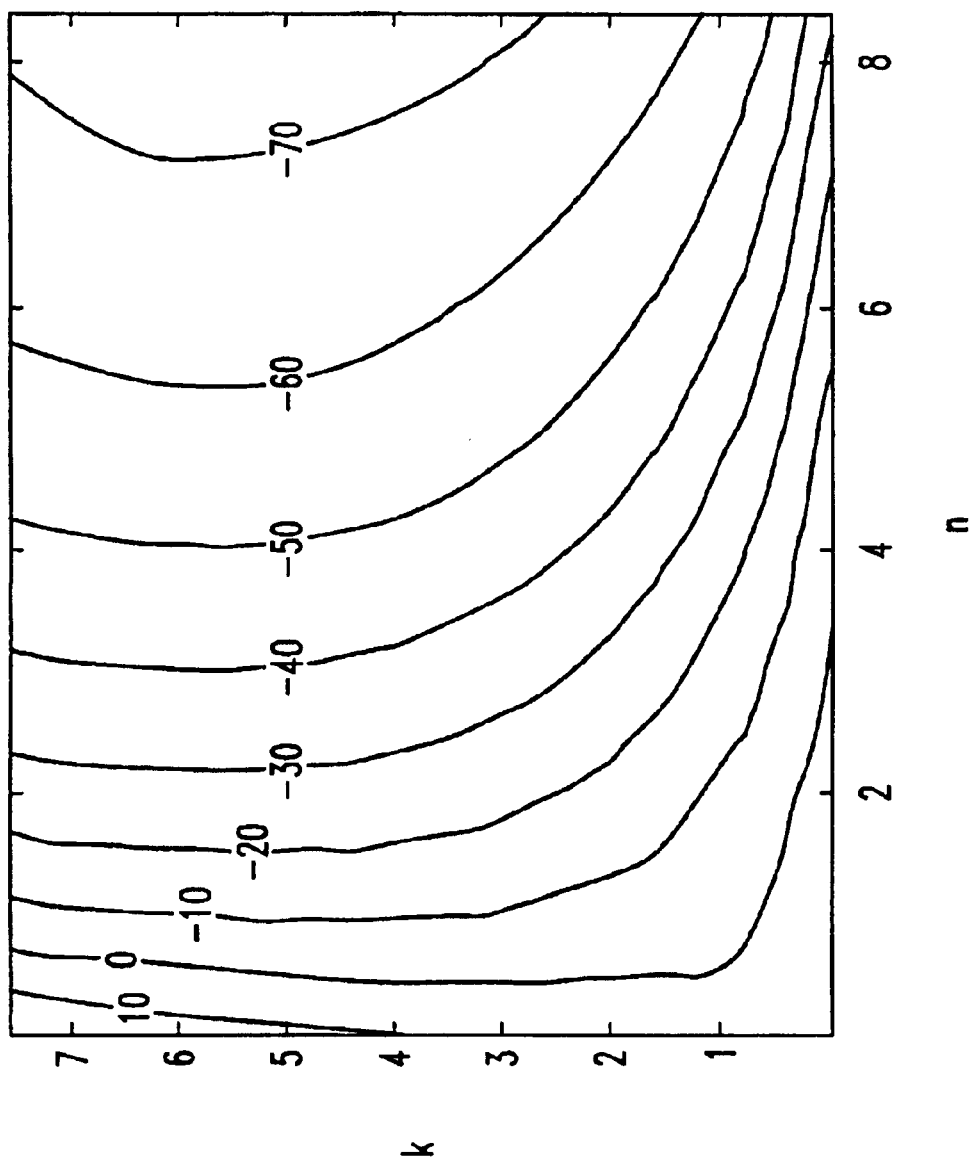
Figure 9B:
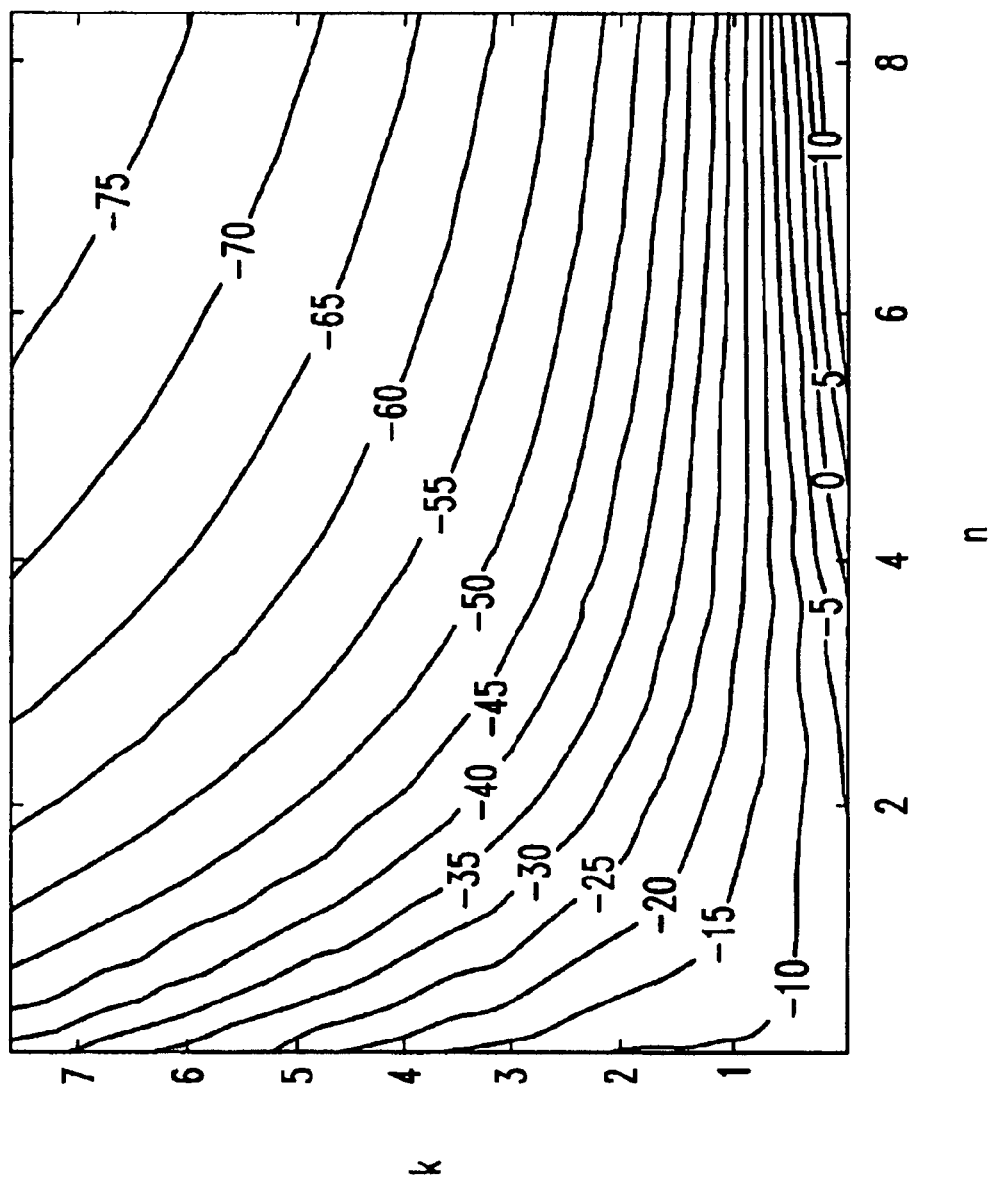

Referring to the drawings, FIG. 8A represents one of the inventive cases in which reduction in the Fabry-Perot loss is accomplished by an insertion of a loss-reducing layer 810 between a bottom surface of a mirror substrate 820 and a stress-balancing optical layer 830. The analysis of loss reduction for this embodiment, which is illustrated in FIG. 9A, indicates that the selection of the material for the loss-reducing layer 810 should favor a material with values of n and k generally located in the upper right corner of FIG. 9A. Using an arbitrary criterion of desired loss-reduction being about 30%, the desired values of n and k are as follows: n is greater than about 2.5 and k is greater than about 3.0. Desired materials for the loss-reducing layer, for the wavelength of incident of 1550 nm (one of the commonly used optical communication wavelengths), include Ti (n=4.04, k=3.82), Ru (n=3.42, k=7.02), Rh (n=3.63, k=10.34), Re (n=3.21, k=8.10), Pt (n=5.31, k=7.04), Pd (n=3.35, k=8.06), Ni (n=3.38, k=6.82), Mn (n=3.75, k=5.34), Fe (n=3.65, k=5.60), Ir (n=3.14, k=8.61), Co (n=6.08, k=5.61), and Cr (n=4.13, k=5.03). The materials which should be avoided to achieve at least 30% reduction in F-P loss for this particular embodiment include Al (n=1.44, k=15.96), Cu (n=1.71, k=17.63), Au (n=0.18, k=10.27), Mo (n=1.64, k=7.35), Nb (n=1.38, k=8.87), Ag (n=0.49, k=13.52), Ta (n=0.89, k=8.77), V (n=1.10, k=5.30), Zr (n=4.03, k=1.42), W (n=2.36, k=4.61), Hf (n=5.41, k=2.62) and Os (n=2.00, k=5.95).

Figure 8B:
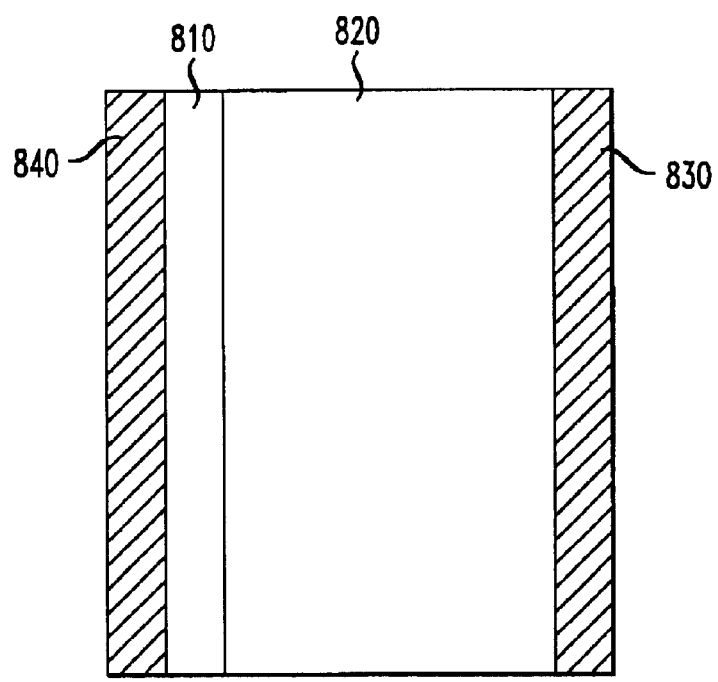

In a second embodiment illustrated in FIG. 8B, the loss-reducing layer 810 is added above the top surface of the mirror substrate 820 and below a light reflective optical layer 840. The data in FIG. 9B indicates that the desired material for the loss-reducing layer for at least about a 30% reduction in the F-P loss, should preferably have the values of n being greater than about 2.0 and values of k being greater than about 2.0. Thus, for this embodiment, the metal list mentioned with respect to FIG. 8A should be modified such that Os, W and Hf can now be taken out of the undesirable materials list and placed in the desirable materials list.

Figure 8C:
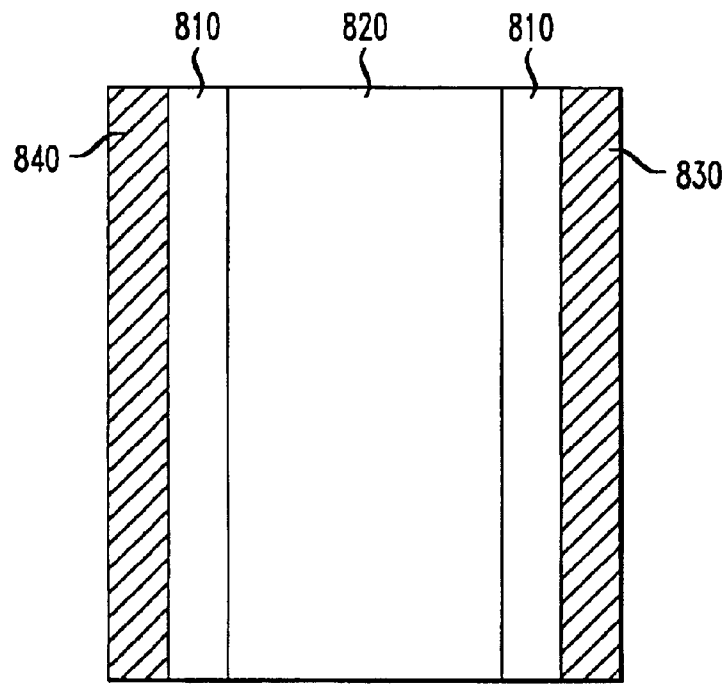
Figure 8D:
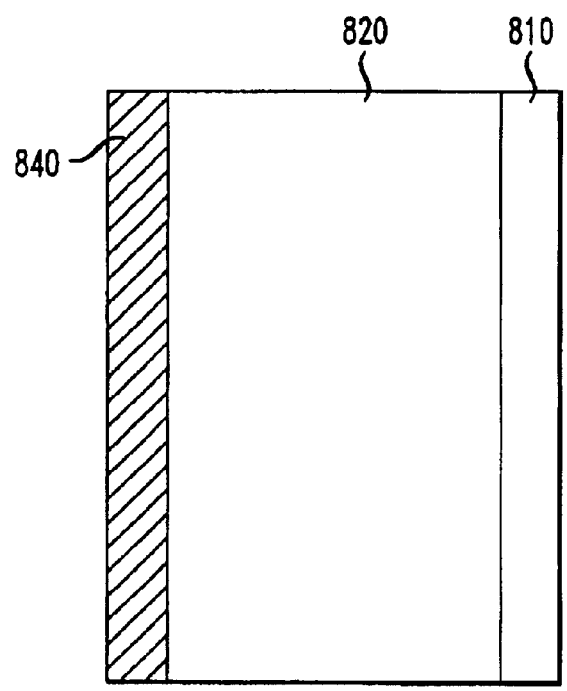
Figure 9C:
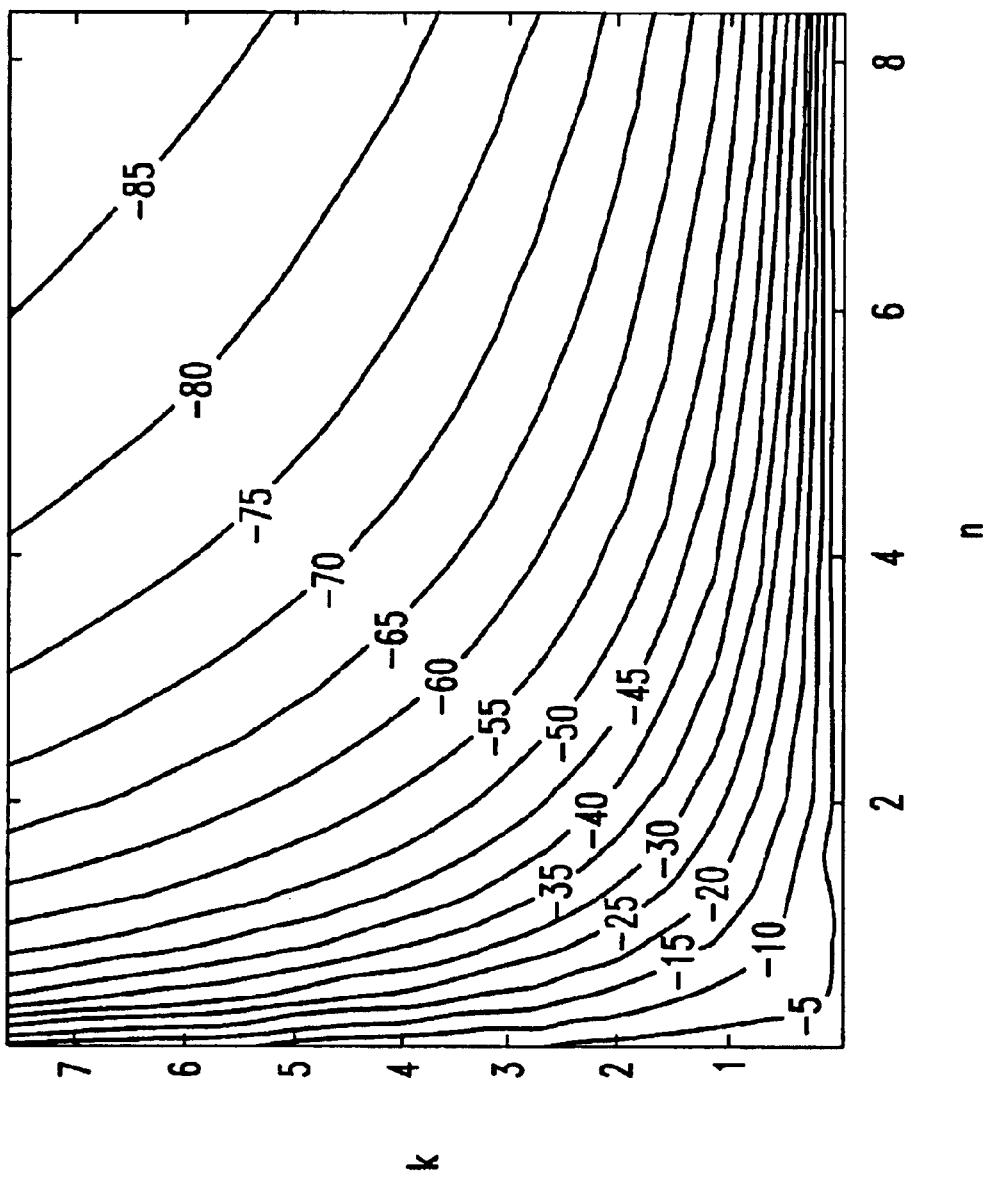
Figure 9D:
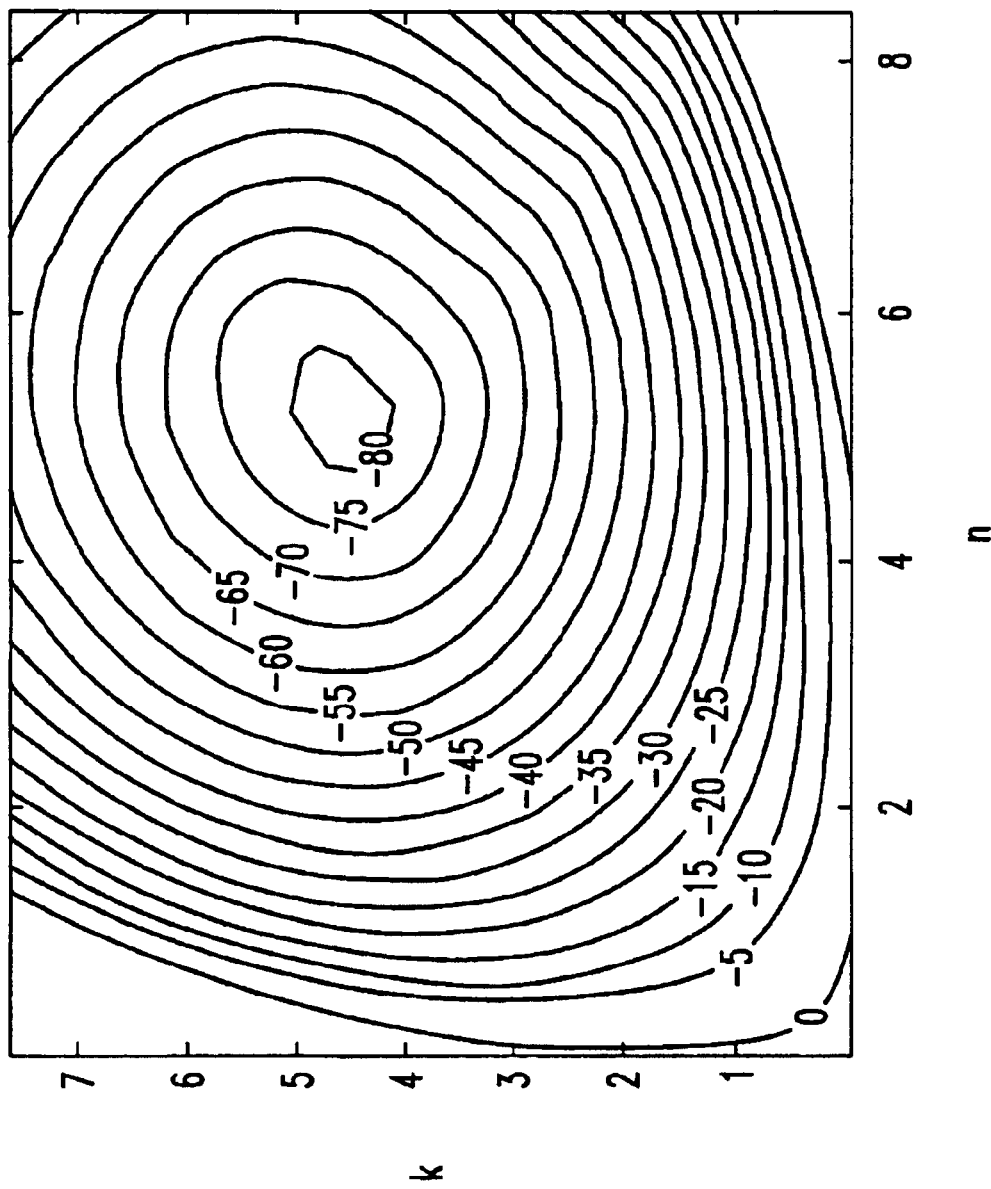

In a third embodiment illustrated in FIG. 8C, the loss-reducing layer 810 is inserted on both sides of the mirror substrate 820, and between the light reflective optical layer 840 and the stress balancing optical layer 830 and the mirror substrate 820, respectively. FIG. 9C indicates that the preferred values include n being greater than about 2.0 and k being greater than about 1.5. Additionally, for the fourth embodiment illustrated in FIGS. 8D and 9D, and where the loss-reducing layer 810 is added only on the bottom surface of the mirror substrate 820, and without the stress balancing optical layer 830, a value of n ranging from about 2.0 to about 10.0 and a value of k ranging from about 1.5 to about 9.0, is preferred.

Figure 8E:
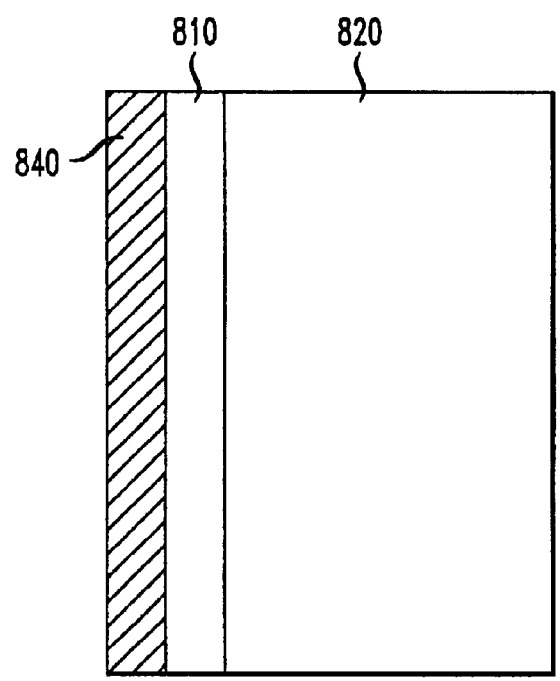
Figure 8F:
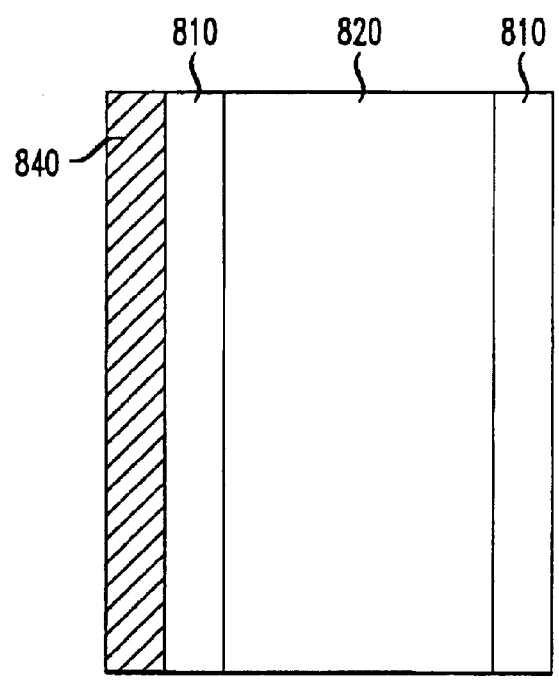
Figure 9E:
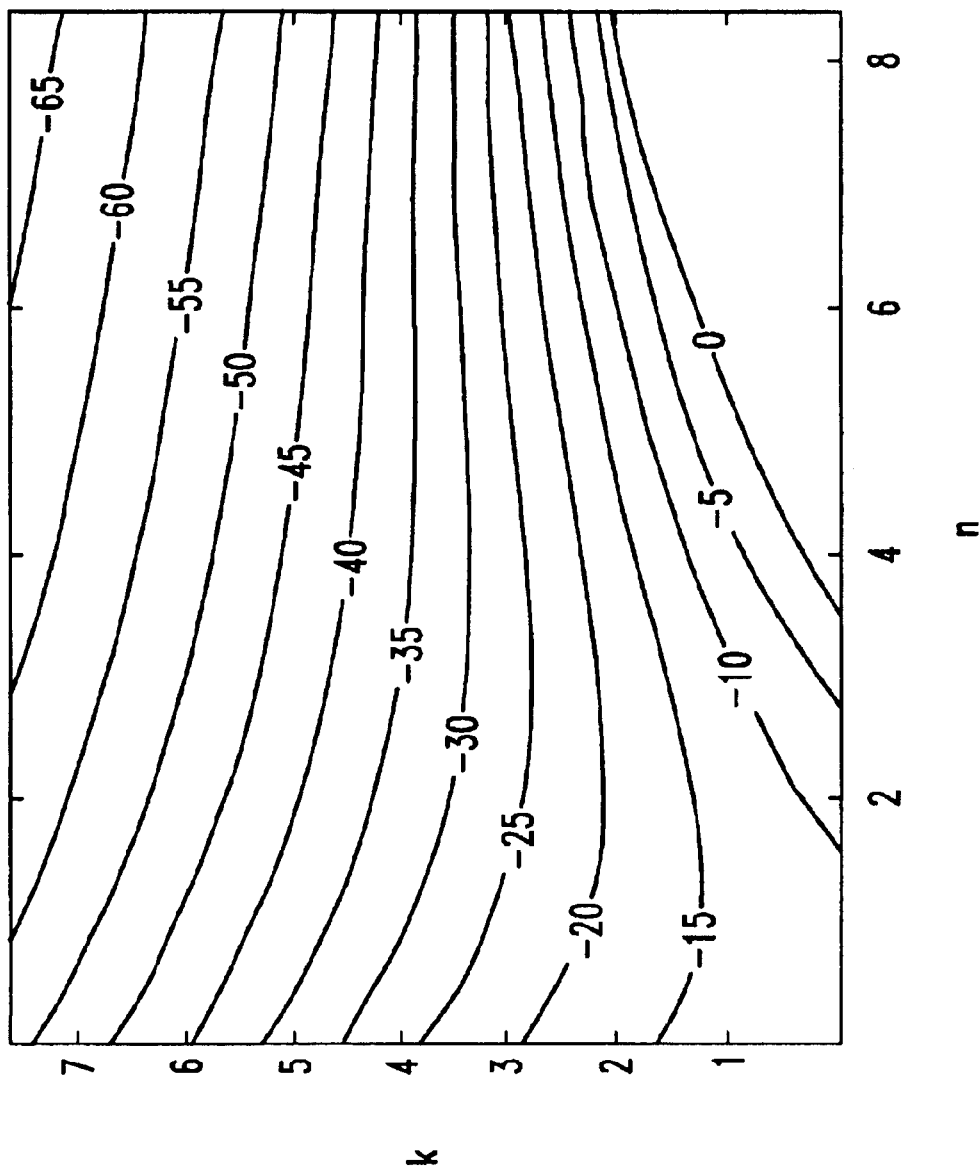
Figure 9F:
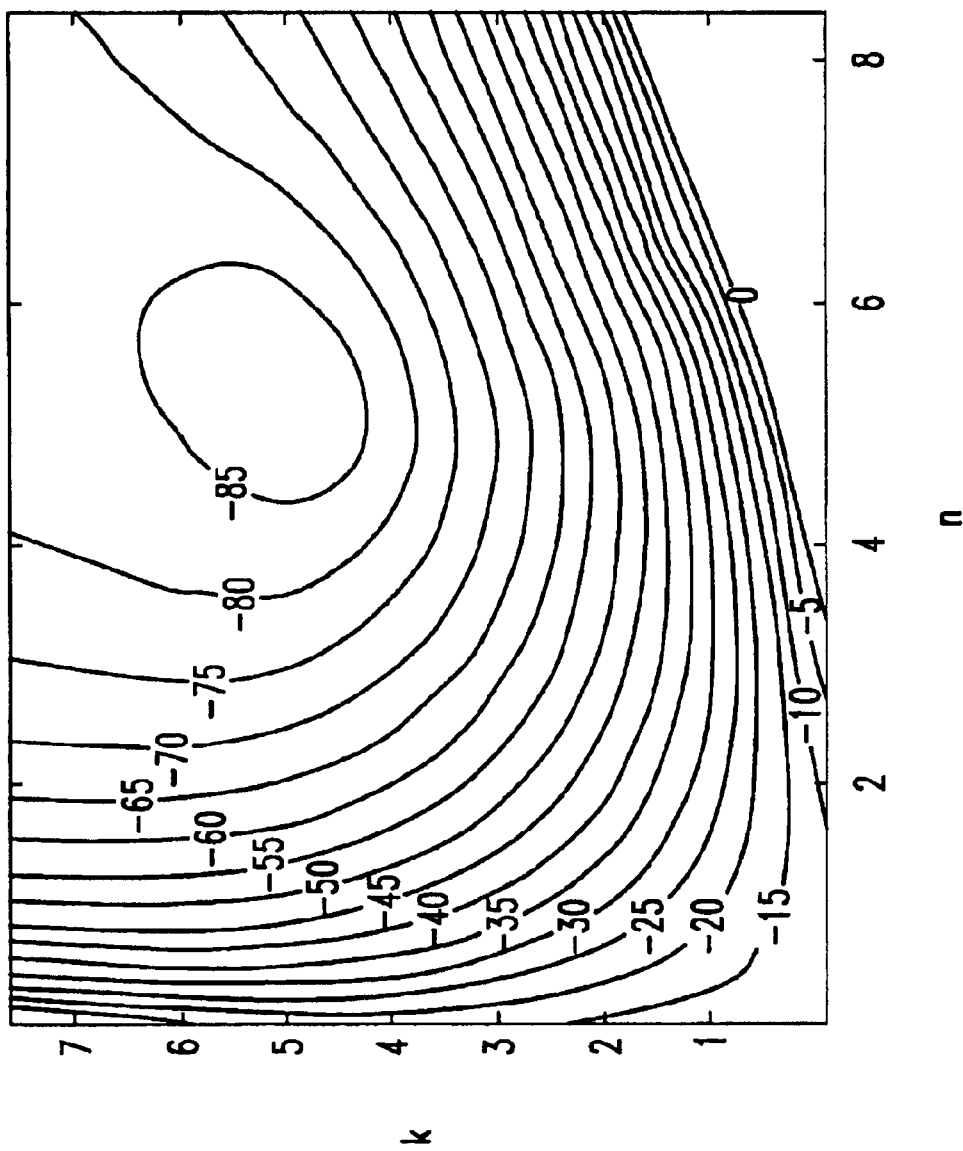

In a fifth embodiment illustrated in FIGS. 8E and 9E, and where the loss-reducing layer 810 is added only onto the top side between the mirror substrate 820 and the light reflective optical layer 840, the value of n is essentially unrestricted, however, the value of k is preferably greater than about 4. Similarly, in a sixth embodiment illustrated in FIGS. 8F and 9F, and where the loss-reducing layers 810 are added on both surfaces of the mirror substrate 820, but where the light reflective optical layer 840 is only located on the top side, a value of n should be greater than about 2 and a value of k should be greater than about 1.

Turning back to FIG. 7, and taking into account the information described above with respect to FIGS. 8A–8F and 9A–9F, the loss-reducing layer 720 may comprise many types of materials having the light reflectivity values listed above, however, in an exemplary embodiment the loss-reducing layer 720 comprises a material selected from the group consisting of titanium, zirconium, hafnium or any alloys thereof. If using titanium, a light reflectivity (at the wavelength discussed above) of about 0.596 may be obtained, and if using zirconium, a light reflectivity of about 0.168 may be obtained. It should be noted that the loss-reducing layer 720 is not limited to the materials discussed above, and that other applicable materials, which have similar reflective values, may be found in the CRC Handbook of Chemistry and Physics, CRC Press, Boston, 1991, Chapter 12, pages 100–115.

The loss-reducing layer 720 may have a wide range of thicknesses, although, in one embodiment, the loss-reducing layer 720 may have a thickness ranging from about 1 nm to about 500 nm. It should be noted, however, in another particularly advantageous embodiment, that the loss-reducing layer 720 has a thickness ranging from about 2 nm to about 20 nm. The loss-reducing layer 720 may be deposited by conventional techniques, such as evaporation, sputtering, electrochemical deposition, or chemical vapor deposition.

Turning to FIG. 10, illustrated is the formation of a light reflective optical layer 1010 over a first side 714 of the mirror substrate 710. In the specific embodiment shown in FIG. 10, the light reflective optical layer 1010 is formed directly on the first side 714 of the mirror substrate 710. An adhesion layer (not shown) may optionally be formed between the light reflective optical layer 1010 and the first side 714 of the mirror substrate 710, in order to prevent the light reflective optical layer 1010 from peeling off the mirror substrate 710, due to poor adhesion. This is particularly important if a noble metal based metallization is used for the light-reflective optical layer 1010, such as gold, silver, palladium and platinum. The chemical inertness of these metals generally results in poor adhesion onto the mirror substrate 710. Exemplary adhesion-promoting layers may comprise chromium, titanium, zirconium or hafnium. A desired thickness of the adhesion layer ranges from about 1 nm to about 100 nm and more preferably from about 2 nm to about 20 nm.

In an exemplary embodiment, a stress balancing optical layer 1020 may be formed over the second side 718 of the wafer substrate 710. In the embodiment shown in FIG. 10, the stress balancing optical layer 1020 is located on an opposite side of the mirror substrate 710 as the light reflective optical layer 1010 and over the loss-reducing layer 720, however, this depends on whether the loss-reducing layer 720 is located on the first side 714, second side 718 or both sides of the mirror substrate 710.

In one illustrative embodiment of the present invention, the stress balancing optical layer 1020 and the light reflective optical layer 1010 comprise a similar material and a similar thickness, so as to exactly or closely counterbalance any stress caused by the light reflective optical layer 1010. Additionally, the light reflective optical layer 1010 and the stress balancing optical layer 1020 may be formed one at a time, or in an exemplary embodiment, formed concurrently. The stress balancing optical layer 1020 substantially reduces many of the mirror curvature and temperature dependent change problems arising from the use of single-sided metallization mirrors. At least one adhesion-promoting bond layer may be desirably added between the loss-reducing layer 720 and the stress balancing optical layer 1020.

The light reflective optical layer 1010 and the stress balancing optical layer 1020 may comprise any material that is generally known to reflect light. In one advantageous embodiment, the light reflective optical layer 1010 or the stress balancing optical layer 1020 comprise a metal light reflective optical layer. In such an embodiment, the metal may comprise any metallic material that reflects light with high reflectivity. For example, in an exemplary embodiment, the light reflective optical layer 1010 or the stress balancing optical layer 1020 may comprise gold, silver, rhodium, platinum, copper or aluminum.

The light reflective optical layer 1010 and the stress balancing optical layer 1020 may be formed using many processes. For instance, they can be deposited by known thin film deposition methods, such as evaporation, sputtering, electrochemical deposition, or chemical vapor deposition. Moreover, they may typically be formed to a thickness ranging from about 20 nm to about 2000 nm. Beyond the thickness of about 2000 nm, a negligible portion of the input light signal reaches the interface between the mirror substrate 710 and the light reflective optical layer 1010, and thus F-P loss becomes negligibly small. Similar thin film deposition techniques may be applied to fabricate the loss-reducing layer 720 and the adhesion layers, as well.

Figure 11:
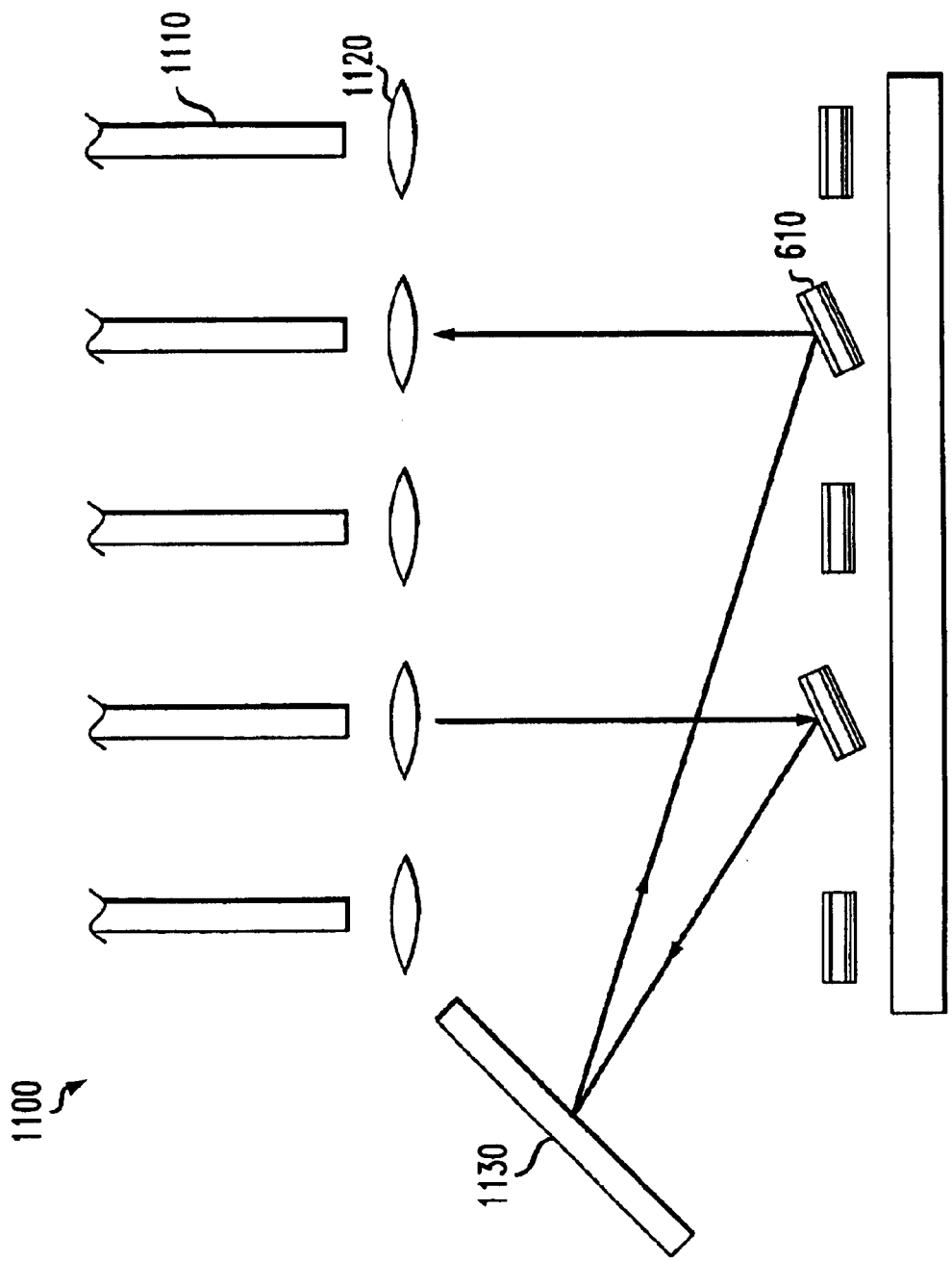
FIG. 11 illustrates an optical communications system, which provides one environment where the mirror may be used.

Turning to FIG. 11, illustrated is an optical communications system 1100. In the embodiment shown in FIG. 11, the optical communications system 1100 includes input/output fiber bundles 1110, the mirrors 610 illustrated in FIG. 6, imaging lenses 1120 interposed between the input/output fiber bundles 1110 and the mirrors 610, and a reflector 1130. The optical communications system 1100 represents an optical cross-connect, which is one environment where the mirror 610 may be used.

Figure 12:
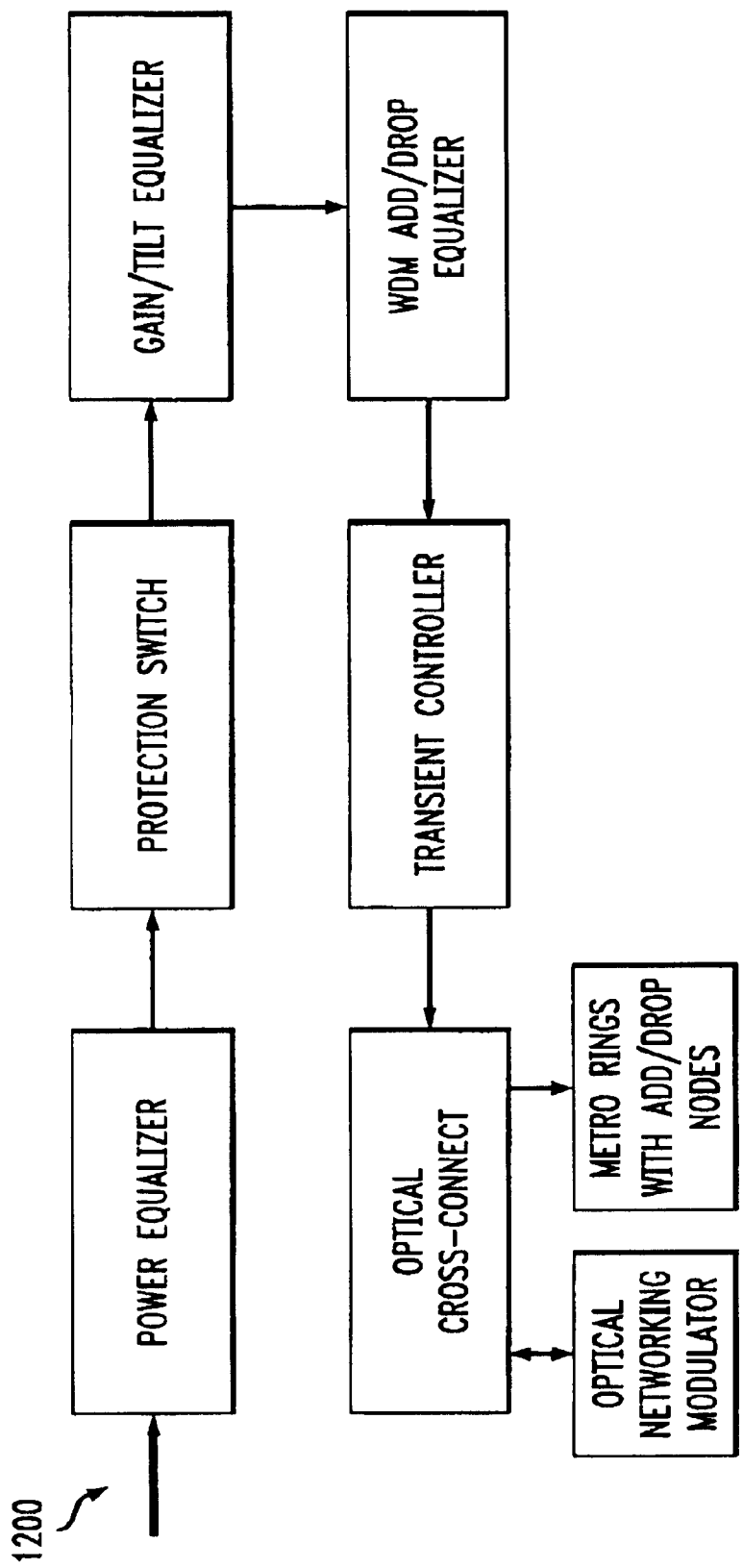
FIG. 12 illustrates an optical networking system incorporating the inventive mirror.

The inventive mirror 610, with stabilized mirror arrays, is useful not only for channel cross-connect, but also for signal re-routing, or signal modification in optical communication networking system. Schematically illustrated in FIG. 12 is an example of such a communication system 1200 comprising an optical cross connect, and other functional devices. In the cross connect, each mirror 610 receives an optical signal from an incoming channel, and reflects it toward an intended output channel location. The input signal may contain many wavelengths, or alternatively, can be demultiplexed into separate wavelength channels. The inventive mirror 610 is also useful for various other light-reflecting mirror systems, since the stability of mirror curvature is essential for reliable operation of most of the MEMS based optical devices. Examples of such devices include those shown in FIG. 12, such as power gain equalizers, switches, wavelength-division-multiplexer (WDM) add/drop devices, optical modulators and optical signal attenuators.

Multi-wavelength optical communication systems will require reconfiguration and reallocation of wavelengths among the various nodes of a network depending on user requirements, e.g., with programmable add/drop elements. One problem limiting the capacity of such systems is that the erbium-doped fiber amplifier, which is often a necessary component in optical communication systems, has a characteristic spectral dependence providing different gain for different wavelength channels. This spectral dependence poses a problem for multichannel WDM systems, because different gains for different channels leads to high bit error rates in some of the channels. As the number of channels passing through the amplifier changes by channel add/drop reconfiguration, the amplifier will start showing deleterious peaks in its gain spectrum at some wavelength channels, requiring modification of the signal spectrum and flattening of the amplifier gains.

One way of flattening the amplifier gain spectrum is to use long period fiber gratings. Long-period fiber grating devices provide wavelength dependent loss and may be used for spectral shaping. See an article by A. M. Vengsarkar et al., *Optical Letters* Vol. 21, p. 336, (1996). A long-period grating couples optical power between two co-propagating modes with very low back reflections. A long-period grating typically comprises a length of optical waveguide wherein a plurality of refractive index perturbations are spaced along the waveguide by a periodic distance, which is large compared to the wavelength of the transmitted light. Long-period fiber grating devices selectively remove light at specific wavelengths by mode conversion. In contrast with conventional Bragg gratings, in which light is reflected and stays in the waveguide core, long-period gratings remove light without reflection, as by converting it from a guided mode to a non-guided mode. A non-guided mode is a mode which is not confined to the core, but rather, is defined by the entire waveguide structure, e.g., based on a cladding mode.

A difficulty with conventional long-period gratings, however, is that their ability to dynamically equalize amplifier gain is limited, because they filter only a fixed wavelength acting as wavelength-dependent loss elements. Such dynamic gain equalizers based on reconfigurable long-period gratings have been disclosed, for example, in the U.S. Pat. No. 5,999,671 (Jin, et al.) It is desirable to be able to equalize amplifier gains over a broad range of wavelengths covering many wavelength channels. Therefore, it would be beneficial to utilize many simultaneously operating mirrors, similar to the mirror 610, each representing one specific demultiplexed wavelength. The design and size scale of the dynamic gain equalizer devices is tailored so that the range of wavelength spectrum and the number of wavelength channels simultaneously controllable, can be optimized and increased if necessary.

In the inventive dynamic gain equalizer based on the mirror 610, the optical signal gain in each wavelength channel can be independently, and simultaneously with other channels, controlled by a multitude of mirrors such as the mirror 610, which reflects that particular signal. The multiplexed optical signal is demultiplexed using suitable demultiplexers such as planar waveguides or thin film devices, with each of the separated wavelength channel signals being sent to each mirror 610 and reflected. By programmably selecting the tilt angle of relevant mirrors slightly off the angle of maximum signal reflection, the losses for various wavelength channels can be intentionally increased to different degrees for the purpose of gain equalizing. The stability of mirror curvature enhanced by the present invention is crucial in ensuring the accuracy of dynamic gain control by different mirrors.

Figure 13:
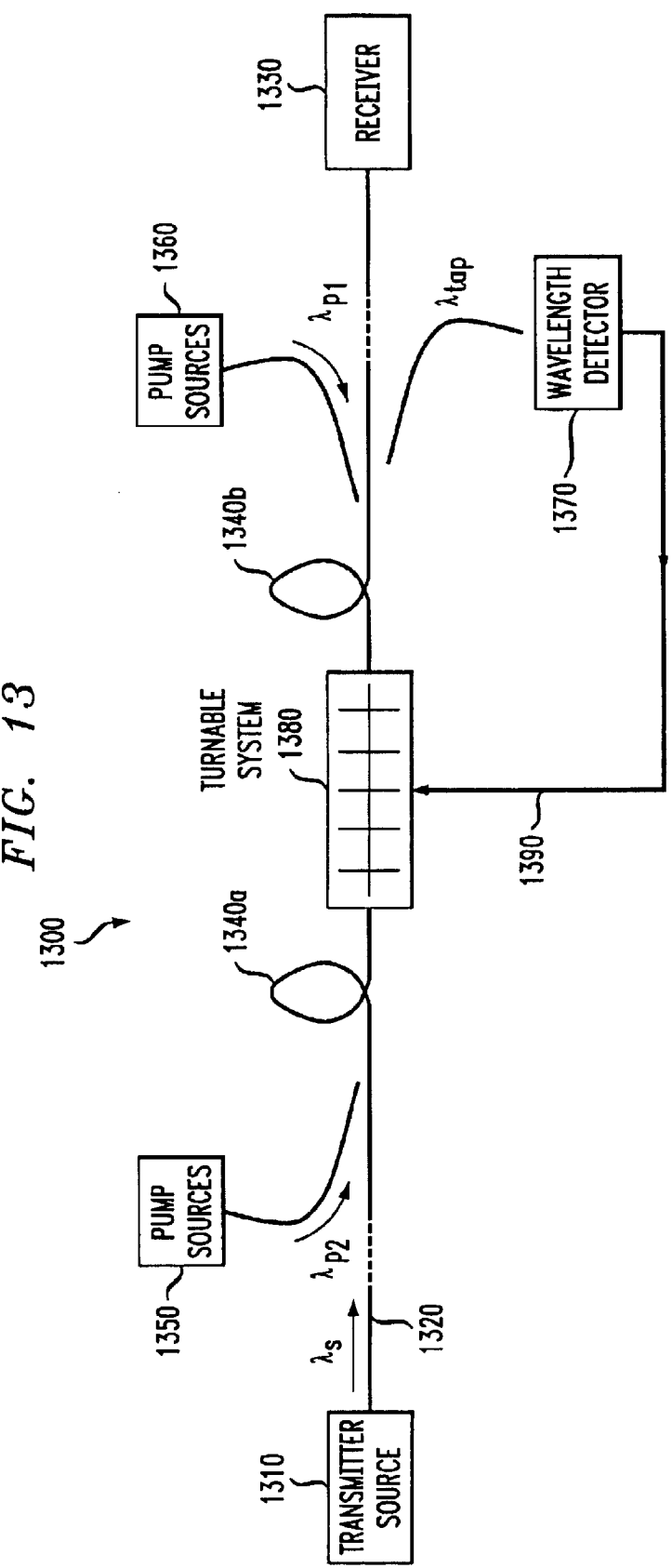
FIG. 13 illustrates an optical communication system comprising a dynamic gain equalizer according to the invention.

Referring to FIG. 13, illustrated is an exemplary optical communication system comprising the mirror 610 according to the invention. The system 1300 comprises dynamically gain-equalized optical amplifiers, a reconfigurable MEMS mirror-type spectral shaping device, and a feedback device. Specifically, the system 1300 comprises a transmitter source 1310 of optical signals, such as a digitally modulated 1.55 $\mu$m signal, an optical signal path comprising a length of optical fiber 1320 for transmitting the signal, and a receiver 1330 for receiving and demodulating the signal. One or more optical amplifiers, such as erbium-doped fiber amplifiers 1340a, 1340b, are disposed in the optical signal path for amplifying the transmitted signal. The amplifiers are pumped by pump sources 1350, 1360, of optical energy having pump wavelengths $\lambda_{p1}$ and $\lambda_{p2}$.

One of the preferred uses of the device of FIG. 13 is to reduce spectral dependence in the gain output of an optical amplifier. For example, the characteristic gain spectrum of an erbium-doped optical fiber amplifier has a pair of gain peaks at about 1.53 $\mu$m and at about 1.56 $\mu$m. Thus, a signal at 1.53 $\mu$m will be amplified more than one at 1.54 $\mu$m, which would be disadvantageous in a wavelength division multiplexing (WDM) system.

By properly demultiplexing the optical signal and sending it to different light-reflecting mirrors for separately programmed attenuation of signal strengths, and by optional tuning of the mirror reflections via a feedback system, the gain spectrum of the amplifier device combination can be made substantially flat over a range of wavelengths. The tunable system 1380 comprises a demultiplexer in combination with a tunable light-reflecting MEMS mirror device and a multiplexer to put together the different wavelength channels into the optical fiber. The device 1380 is connected to a feedback system 1390, having a wavelength detector 1370 coupled to the fiber 1320 for detecting the wavelength response $\lambda_{tap}$. The feedback system 1390 automatically adjusts the tuning of the device 1380 depending upon $\lambda_{tap}$. Advantageously, system 1300 can be a WDM system using a plurality of different wavelength signals, e.g., $\lambda_{s1}$ and $\lambda_{s2}$, and a plurality of tunable MEMS mirror devices coupled to one or more detectors.

The device 600 can also be useful as a multi-channel optical add/drop device. Modern, high-density optical communications utilize wavelength division multiplexed communication systems which employ multiplexer/ demultiplexer devices. In such systems, a "trunk" fiber carries optical signal channels at several wavelengths $\lambda_1, \lambda_2, \ldots \lambda_n$ and it is desirable to extract a single wavelength channel from the trunk fiber or to add a single wavelength channel onto the trunk. A wide variety of such devices can be made, for example, by interconnecting optical circulators and tunable fiber Bragg gratings. See, U.S. Pat. No. 5,781,677 by Jin et al. Typically the channel reflected by the grating is dropped to the trunk fiber or is added to the trunk. Gratings as described herein permit selection at the grating of which channel is dropped or added. In the case of MEMS based devices, an array of mirrors such as the mirror 610, allows channel add/drop operation in a free-space mode thus providing a convenient capability to carry out the add/drop operations for many hundreds or even thousands of channels simultaneously, thus providing a much enhanced capability as compared to the grating-based add/drop systems.

Filters and attenuators are useful in communication systems to change the power levels of various signals. In modern communications systems, variable attenuators are becoming increasingly more important, especially in dense wavelength-division multiplexed (DWDM) systems. Variable attenuators are used to vary the amount of loss light will experience as it passes through the system. This loss may range from low loss (<1 dB), to very high loss (>30 dB). The mechanism by which the attenuators induce loss in the signals may be attributable to coupling loss between fibers, polarization loss, absorption loss, scattering loss, or any combination of these.

Variable attenuators typically include complicated structures with moving parts that rotate or otherwise move the position of the fibers or a separate attenuator device. For example, U.S. Pat. No. 5,745,634 to Garrett, et al., "Voltage Controlled Attenuator," issued Apr. 28, 1998, shows a variable attenuator with which the variation in attenuation is obtained by actuating a DC motor which displaces the position of the attenuator. U.S. Pat. No. 5,677,977 to Smith, "Optical Attenuator," issued Oct. 14, 1997, shows a variable attenuator with which the variation in attenuation is obtained by providing a circular loop of optical fiber which is rotated with use of a lockable rotating shaft clamped to the side of the loop. U.S. Pat. No. 5,781,341 to Lee, "Motorized Tunable Filter and Motorized Variable Attenuator," issued Jul. 14, 1998, shows a variable attenuator with use of a cam attached to a collimator; the cam rotates the collimator to adjust the loss.

A variable attenuator based on coupling loss is typically composed of two separated fibers whose separation is controlled with mechanical motion. As the amount of the separation between the fibers increases, the amount of loss also increases. See, for example, Brenner et al., "Low-Reflectivity In-Line Variable Attenuator Utilizing Optical Fiber Tapers," J. LIGHTWAVE TECH., Vol. 18 (1990), at p. 7, which is incorporated herein by reference.

Figure 14:
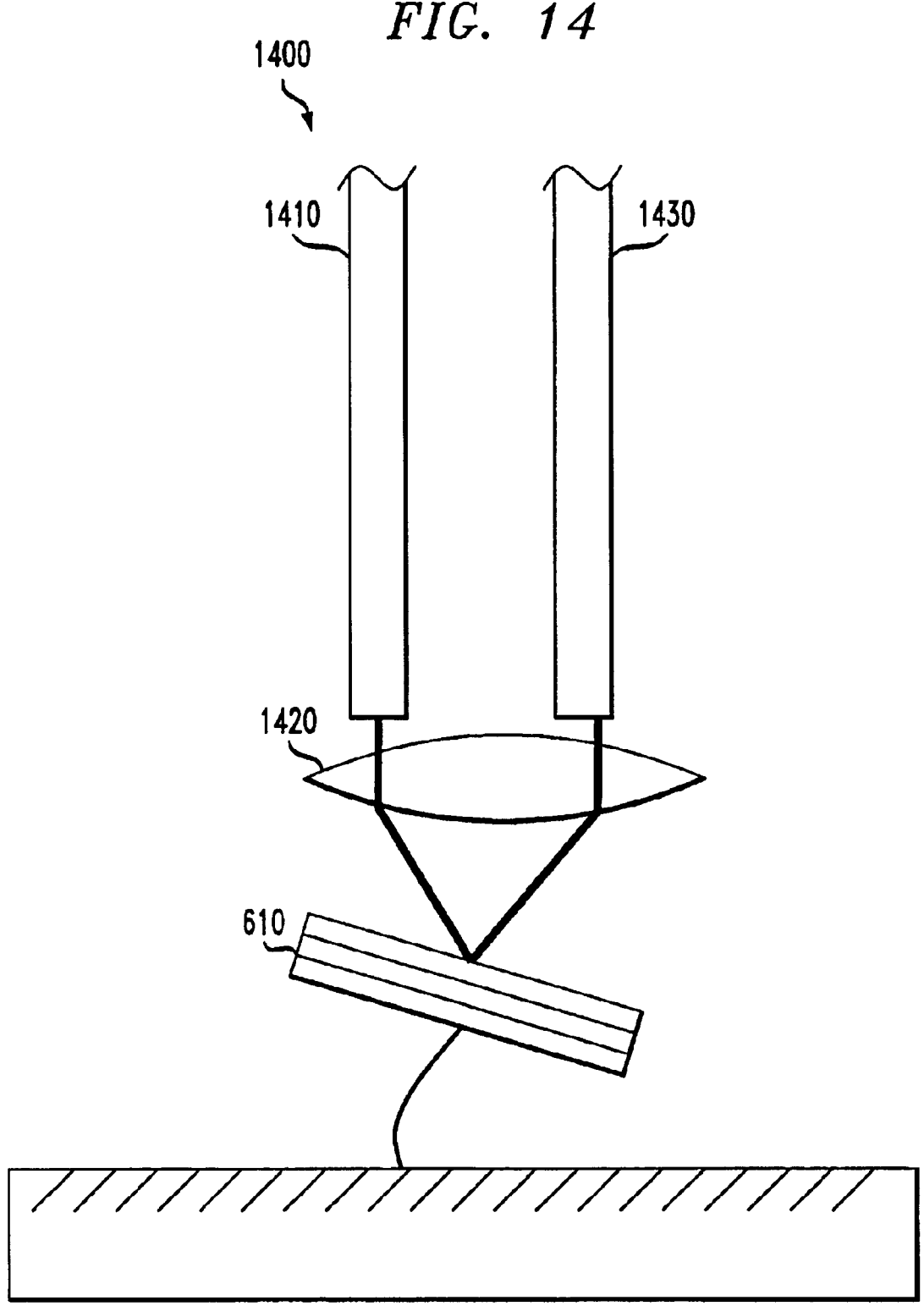
FIG. 14 illustrates an optical signal modulator comprising the improved mirror, according to the invention.

As can be seen, variable attenuators typically have involved use of bulk moving parts and are not always amenable to small, high-density device arrays. As may be appreciated, those concerned with the development of optical communications systems continually search for new components and designs including new attenuator designs. As optical communications systems become more advanced, there is growing interest in reducing the dimension of the attenuator devices, and in increasing the number of wavelength channels that may be transmitted, relayed, modulated/attenuated, filtered, or switched. The instant invention comprising the mirror 610, such as schematically illustrated in FIG. 14, provides a variable attenuator device that may be used to reliably achieve desired signal attenuation in many channels. Here, the movable MEMS mirrors are advantageously used to intentionally misalign the reflecting light beam relative to the output fiber core location, essentially obtaining signal attenuation. Also included within the embodiment shown in FIG. 14, are a first fiber optic line 1410, a lense 1420, the mirror 610 and a second offset fiber optic line 1430.

The inventive methods and structures can also be applied to devices which are not MEMS type devices. Any light-reflecting system comprising a mirror or an array of mirrors with the light reflective optical layer 630 and the stress balancing optical layer 660 can be improved by the insertion of the loss-reducing layer 650. For example, the mirror size may be larger than about 1 cm in diameter. It should further be understood that the above-described embodiments are illustrative of only a few of the many possible specific embodiments which may represent applications of the present invention. Numerous and varied other arrangements can be made by those skilled in the art without departing from the spirit and scope of the present invention.

Although the present invention has been described in detail, those skilled in the art should understand that they can make various changes, substitutions and alterations herein without departing from the spirit and scope of the invention in its broadest form.

What is claimed is:

1. For use with a micro-electro-mechanical system (MEMS) optical device, a mirror, comprising:

a mirror substrate having a light reflective optical layer located over a first or second side thereof;

a stress balancing optical layer located over an opposite side of the substrate as the light reflective optical layer, wherein the light reflective optical layer and the stress balancing optical layer combine to form a Fabry-Perot type structure introducing Fabry-Perot interferrometric loss; and a loss-reducing layer located between the light reflective optical layer and the stress balancing optical layer thereby reducing the interferrometric loss.

2. The mirror as recited in claim 1 wherein the loss-reducing layer has a light reflectivity of less than about 0.6 for optical beam communication wavelengths of about 1.55 µm.

3. The mirror as recited in claim 2 wherein the loss-reducing layer has a light reflectivity of less than about 0.2 for optical beam communication wavelengths of about 1.55 µm.

4. The mirror as recited in claim 2 wherein the loss-reducing layer comprises a material selected from the group of materials consisting of titanium, zirconium, hafnium and any alloys thereof.

5. The mirror as recited in claim 1 wherein the loss-reducing layer has a thickness ranging from about 1 nm to about 500 nm.

6. The mirror as recited in claim 5 wherein the loss-reducing layer has a thickness ranging from about 2 nm to about 20 nm.

7. The mirror as recited in claim 1 wherein the light reflective optical layer comprises a material selected from the group consisting of gold, silver and aluminum.

8. The mirror as recited in claim 1 wherein the loss-reducing layer is located over the first and second sides of the mirror substrate.

9. The mirror as recited in claim 1 wherein the loss-reducing layer is located over the second side of the mirror substrate and the stress balancing optical layer is located over the loss-reducing layer.

10. A method of manufacturing a mirror for use in a micro-electro-mechanical system (MEMS) optical device, comprising:
    forming a mirror substrate having a light reflective optical layer located over a first or second side thereof;
    forming a stress balancing optical layer located over an opposite side of the substrate as the light reflective optical layer, wherein the light reflective optical layer and the stress balancing optical layer combine to form a Fabry-Perot type structure introducing Fabry-Perot interferrometric loss; and
    forming a loss-reducing layer located between the light reflective optical layer and the stress balancing optical layer thereby reducing the interferrometric loss.

11. The method as recited in claim 10 wherein forming a loss-reducing layer includes forming a loss-reducing layer having a light reflectivity of less than about 0.6 for optical beam communication wavelengths of about 1.55 $\mu$m.

12. The method as recited in claim 11 wherein forming a loss-reducing layer includes forming a loss-reducing layer having a light reflectivity of less than about 0.2 for optical beam communication wavelengths of about 1.55 $\mu$m.

13. The method as recited in claim 11 wherein forming a loss-reducing layer includes forming a loss-reducing layer comprising a material selected from the group of materials consisting of titanium, zirconium, hafnium and any alloys thereof.

14. The method as recited in claim 10 wherein forming a loss-reducing layer includes forming a loss-reducing layer having a thickness ranging from about 1 nm to about 500 nm.

15. The method as recited in claim 14 wherein forming a loss-reducing layer includes forming a loss-reducing layer having a thickness ranging from about 2 nm to about 20 nm.

16. The method as recited in claim 10 wherein the light reflective optical layer comprises a material selected from the group consisting of gold, silver and aluminum.

17. The method as recited in claim 10 wherein forming a loss-reducing layer includes forming a loss-reducing layer over a first and second side of a the mirror substrate.

18. The method as recited in claim 10 wherein forming a loss-reducing layer includes forming the loss-reducing layer over the second side of the mirror substrate and further includes forming the stress balancing optical layer over the loss-reducing layer.

19. An optical communications system, comprising:
    input/output fiber bundles;
    a micro-electro-mechanical structure, comprising:
        a mirror, including;
            a mirror substrate having a light reflective optical layer located over a first or second side thereof;
            a stress balancing optical layer located over an opposite side of the substrate as the light reflective optical layer, wherein the light reflective optical layer and the stress balancing optical layer combine to form a Fabry-Perot type structure introducing Fabry-Perot interferrometric loss; and
            a loss-reducing layer located between the light reflective optical layer and the stress balancing optical layer thereby reducing the interferrometric loss; and
        one or more actuating electrodes configured to controllably move the mirrors;
        a spacer which separates the mirror and the actuating electrodes;
    imaging lenses interposed between the input/output fiber bundles and the micro-electro-mechanical structure; and
    a reflector.

20. The optical communications system as recited in claim 19 wherein the loss-reducing layer has a light reflectivity of less than about 0.6 for optical beam communication wavelengths of about 1.55 $\mu$m.

21. The optical communications system as recited in claim 20 wherein the loss-reducing layer has a light reflectivity of less than about 0.2 for optical beam communication wavelengths of about 1.55 $\mu$m.

22. The optical communications system as recited in claim 20 wherein the loss-reducing layer comprises a material selected from the group of materials consisting of titanium, zirconium, hafnium and any alloys thereof.

23. The optical communications system as recited in claim 19 wherein the loss-reducing layer has a thickness ranging from about 1 nm to about 500 nm.

24. The optical communications system as recited in claim 23 wherein the loss-reducing layer has a thickness ranging from about 2 nm to about 20 nm.

25. The optical communications system as recited in claim 19 wherein the light reflective optical layer comprises a material selected from the group consisting of gold, silver and aluminum.

26. The optical communications system as recited in claim 19 wherein the loss-reducing layer is located over the first and second sides of the mirror substrate.

27. The optical communications system as recited in claim 19 wherein the loss-reducing layer is located over the second side of the mirror substrate and the stress balancing optical layer is located over the loss-reducing layer.

28. The optical communications system recited in claim 19 that comprises one or more devices selected from the group consisting of:
    a micro-electro-mechanical system (MEMS) optical cross connect system;
    an optical power gain equalizer system;
    a wavelength division multiplexing telecommunications system;
    a light signal switch in an optical communications system; and
    a variable optical attenuator in an optical communications system.

29. A micro-electro-mechanical system (MEMS) optical device, comprising:
    a mirror, including;
        a mirror substrate having a light reflective optical layer located over a first or second side thereof;
        a stress balancing optical layer located over an opposite side of the substrate as the light reflective optical layer, wherein the light reflective optical layer and the stress balancing optical layer combine to form a Fabry-Perot type structure introducing Fabry-Perot interferrometric loss; and
        a loss-reducing layer located between the light reflective optical layer and the stress balancing optical layer thereby reducing the interferrometric loss;
    one or more actuating electrodes configured to controllably move the mirror; and
    a spacer which separates the mirror and the actuating electrodes.

30. The micro-electro-mechanical system (MEMS) optical device as recited in claim 29 wherein the loss-reducing layer has a light reflectivity of less than about 0.6 for optical beam communication wavelengths of about 1.55 $\mu$m.

31. The micro-electro-mechanical system (MEMS) optical device as recited in claim 30 wherein the loss-reducing layer has a light reflectivity of less than about 0.2 for optical beam communication wavelengths of about 1.55 μm.

32. The micro-electro-mechanical system (MEMS) optical device as recited in claim 30 wherein the loss-reducing layer comprises a material selected from the group of materials consisting of titanium, zirconium, hafnium and any alloys thereof.

33. The micro-electro-mechanical system (MEMS) optical device as recited in claim 29 wherein the loss-reducing layer has a thickness ranging from about 1 nm to about 500 nm.

34. The micro-electro-mechanical system (MEMS) optical device as recited in claim 33 wherein the loss-reducing layer has a thickness ranging from about 2 nm to about 20 nm.

35. The micro-electro-mechanical system (MEMS) optical device as recited in claim 29, wherein the light reflective optical layer comprises a material selected from the group consisting of gold, silver and aluminum.

36. The micro-electro-mechanical system (MEMS) optical device as recited in claim 29 wherein the loss-reducing layer is located over the first and second sides of the mirror substrate.

37. The micro-electro-mechanical system (MEMS) optical device as recited in claim 29 wherein the loss-reducing layer is located over the second side of the mirror substrate and the stress balancing optical layer is located over the loss-reducing layer.

38. The micro-electro-mechanical system (MEMS) optical device as recited in claim 29 wherein the mirror includes an array of mirrors coupled together that function as a unit.

* * * * *